United States Patent [19]
Ojima et al.

[11] Patent Number: 5,488,487
[45] Date of Patent: Jan. 30, 1996

[54] IMAGE FORMING APPARATUS, AND MODULATING METHOD THEREIN

[75] Inventors: Masaki Ojima; Masaharu Ohkubo, both of Yokohama; Michio Itoh, Hachiohji; Hiroshi Sasame; Hiromichi Yamada, both of Yokohama; Tetsuo Saito, Tokyo; Atsushi Kashihara, Hachiohji; Takashi Kawana, Yokohama; Hiroshi Mano, Tokyo; Kaoru Seto, Chigasaki; Hiroshi Atobe, Yokohama, all of Japan

[73] Assignee: Canon Kabushiki Kaisha, Tokyo, Japan

[21] Appl. No.: 107,037

[22] Filed: Aug. 17, 1993

Related U.S. Application Data

[63] Continuation of Ser. No. 590,700, Oct. 1, 1990, abandoned.

[30] Foreign Application Priority Data

| Oct. 2, 1989 | [JP] | Japan | 1-255294 |
| Oct. 17, 1989 | [JP] | Japan | 1-268227 |
| Nov. 23, 1989 | [JP] | Japan | 1-299732 |

[51] Int. Cl.$^6$ .......................... H04N 1/23; H03K 5/135; H03K 5/14
[52] U.S. Cl. .......................... 358/456; 358/445; 358/298; 327/258
[58] Field of Search .................. 358/298, 296, 358/300, 302, 410, 412, 445, 456; 346/108, 160, 76 L; 307/269

[56] References Cited

U.S. PATENT DOCUMENTS

| 4,347,523 | 8/1982 | Ohara . |
| 4,365,202 | 12/1982 | Sinniger . |
| 4,413,269 | 11/1983 | Pawletko et al. |
| 4,415,907 | 11/1983 | Suemori . |
| 4,498,090 | 2/1985 | Honda et al. |
| 4,553,173 | 11/1985 | Kawamura . |
| 4,633,222 | 12/1986 | Dingwall . |
| 4,679,057 | 7/1987 | Hamada . |
| 4,754,291 | 6/1988 | Horikawa . |
| 4,800,442 | 1/1989 | Riseman . |
| 4,819,066 | 4/1989 | Miyagi . |
| 4,905,022 | 2/1990 | Nagasawa .............. 346/108 |

FOREIGN PATENT DOCUMENTS

| 080075 | 6/1983 | European Pat. Off. |
| 0104285 | 4/1984 | European Pat. Off. |
| 0234809 | 9/1987 | European Pat. Off. |
| 56-138328 | 10/1981 | Japan . |
| 59-131225 | 7/1984 | Japan . |
| 59-223070 | 12/1984 | Japan . |
| 60-100831 | 6/1985 | Japan . |
| 60-116220 | 6/1985 | Japan . |
| 61-30118 | 2/1986 | Japan . |
| 63-045973 | 2/1988 | Japan . |
| 64-067030 | 3/1989 | Japan . |
| 1-129774 | 5/1989 | Japan . |
| 2196498 | 4/1988 | United Kingdom . |

*Primary Examiner*—Scott A. Rogers
*Attorney, Agent, or Firm*—Fitzpatrick, Cella, Harper & Scinto

[57] ABSTRACT

A multivalued input recording signal is subjected to pulse-width modulation at a time unit shorter than the period of a clock signal within the period of the recording signal. Alternatively, the multivalued input recording signal is converted into a plurality of different signals each of whose length of time is shorter than a clock signal within the period of the recording signal, thereby performing pulse-width modulation in accordance with a predetermined weighting. This makes it possible to obtain a highly toned recording signal without raising the frequency of the clock signal. Further, density tone data is generated in dependence upon inputted multivalued pixel data, and control is performed using both the irradiation time and emission intensity of a light beam based on the generated density tone data. An image is formed by irradiating a photosensitive body with the controlled light beam.

14 Claims, 30 Drawing Sheets

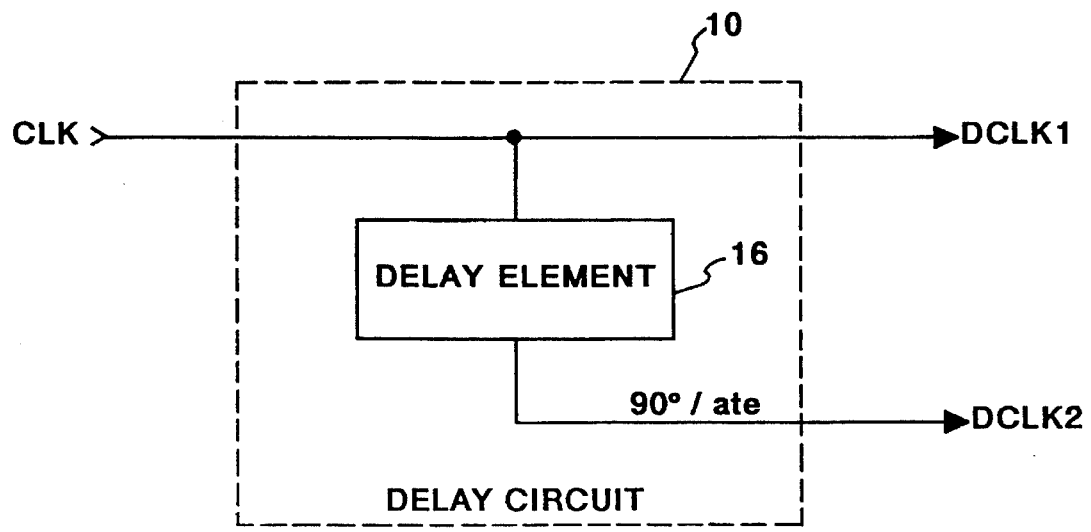
F I G. 2
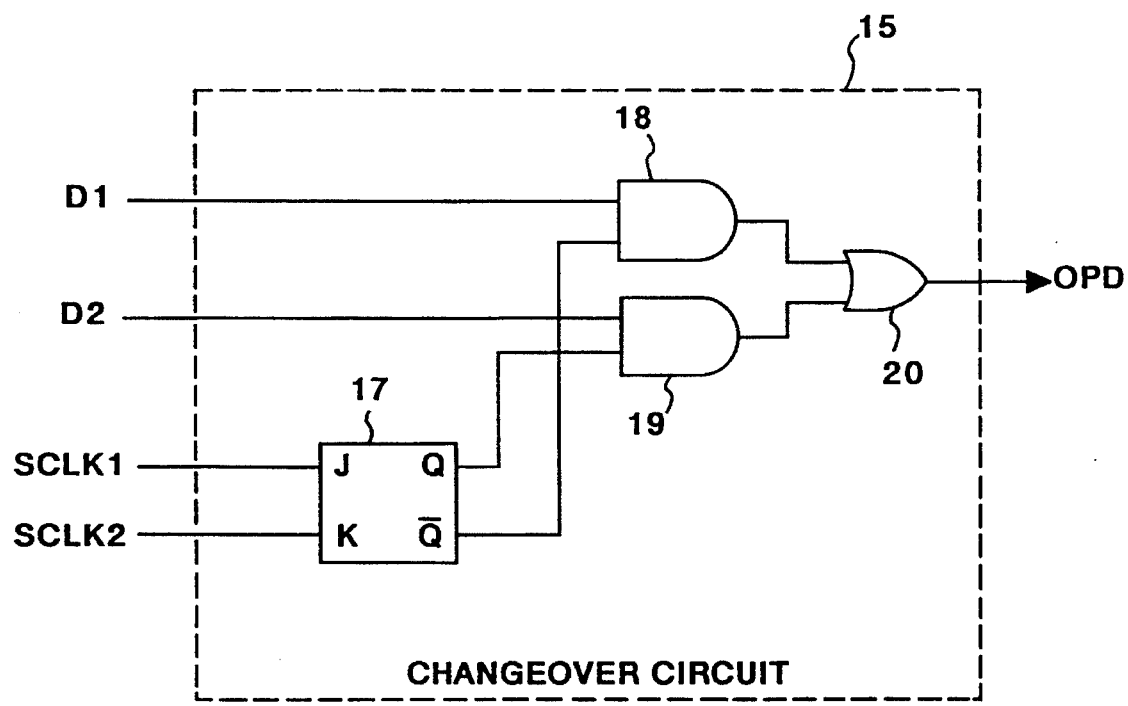
F I G. 3

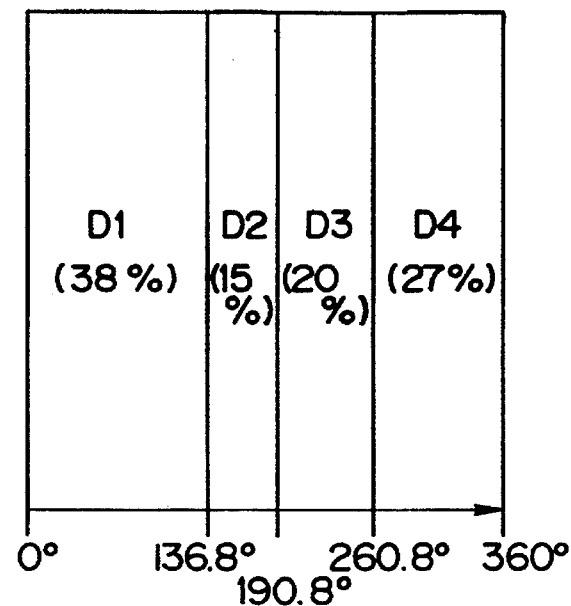
F I G. 6
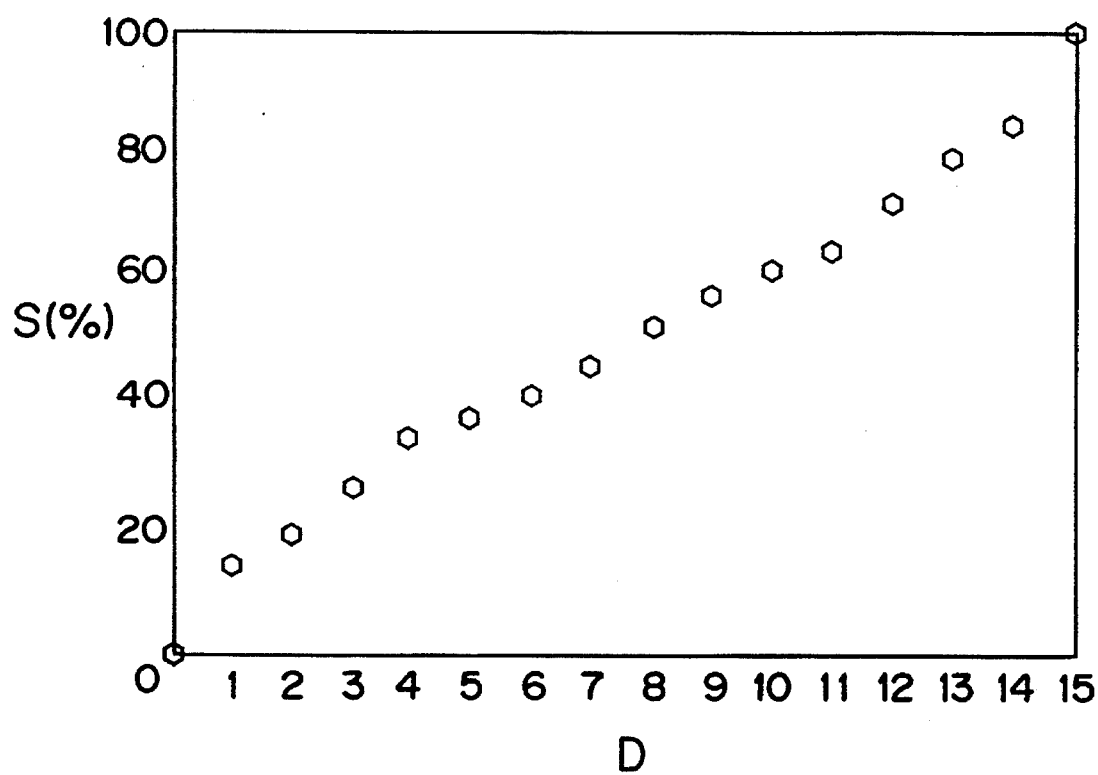
F I G. 7

| D | S (%) | VDO | VD ||||
|---|---|---|---|---|---|---|
| | | | D1 | D2 | D3 | D4 |
| 0 | 0 | 00H ~ 13H | 0 | 0 | 0 | 0 |
| 1 | 15 | 14H ~ 2CH | 0 | 1 | 0 | 0 |
| 2 | 20 | 2DH ~ 3CH | 0 | 0 | 1 | 0 |
| 3 | 27 | 3DH ~ 4FH | 0 | 0 | 0 | 1 |
| 4 | 35 | 50H ~ 5DH | 0 | 1 | 1 | 0 |
| 5 | 38 | 5EH ~ 66H | 1 | 0 | 0 | 0 |
| 6 | 42 | 67H ~ 71H | 0 | 1 | 0 | 1 |
| 7 | 47 | 72H ~ 7FH | 0 | 0 | 1 | 1 |
| 8 | 53 | 80H ~ 8DH | 1 | 1 | 0 | 0 |
| 9 | 58 | 8EH ~ 99H | 1 | 0 | 1 | 0 |
| 10 | 62 | 9AH ~ A2H | 0 | 1 | 1 | 1 |
| 11 | 65 | A3H ~ B0H | 1 | 0 | 0 | 1 |
| 12 | 73 | B1H ~ C3H | 1 | 1 | 1 | 0 |
| 13 | 80 | C4H ~ D2H | 1 | 1 | 0 | 1 |
| 14 | 85 | D3H ~ ECH | 1 | 0 | 1 | 1 |
| 15 | 100 | EDH ~ FFH | 1 | 1 | 1 | 1 |

FIG. 8

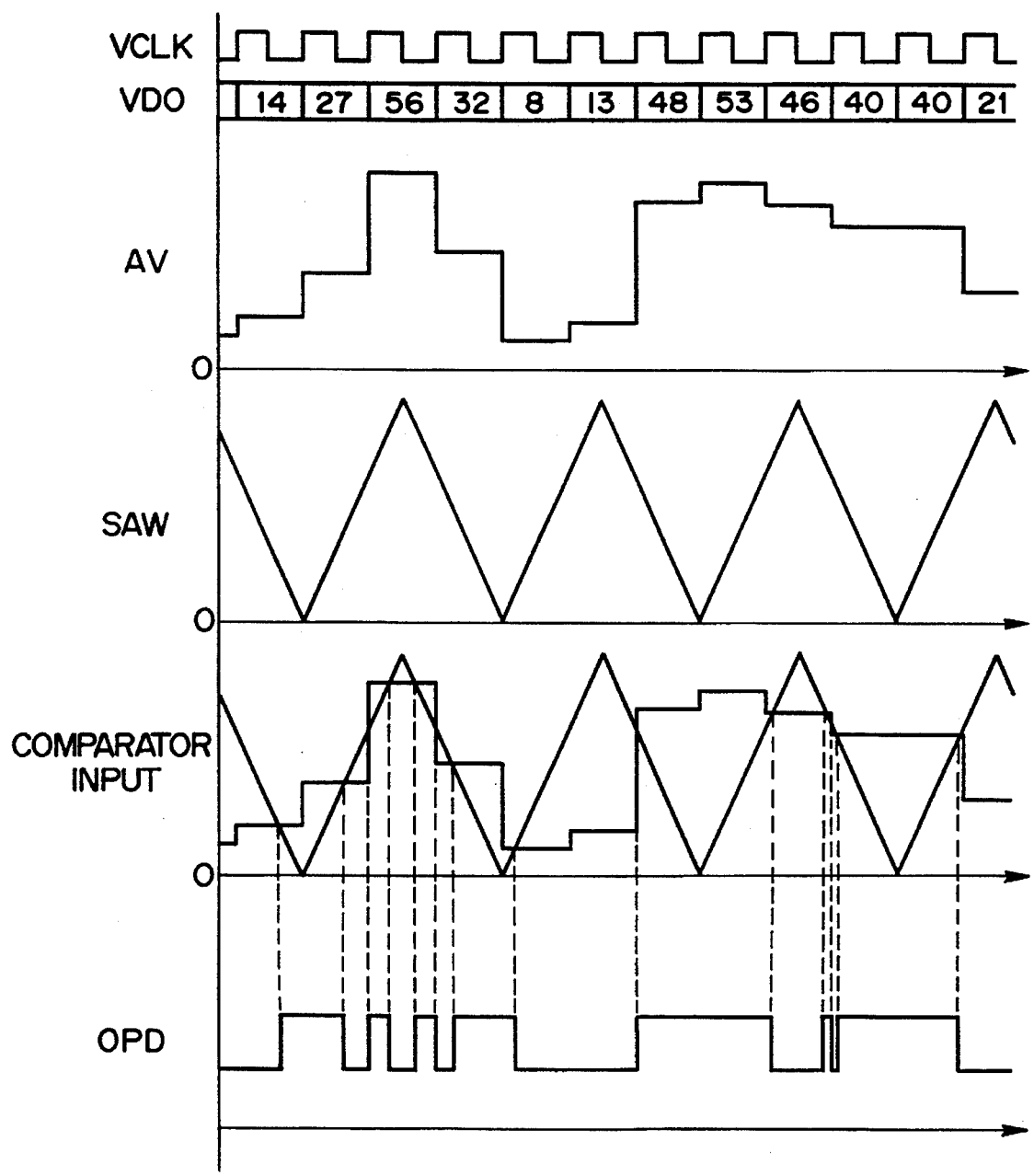
F I G. 12

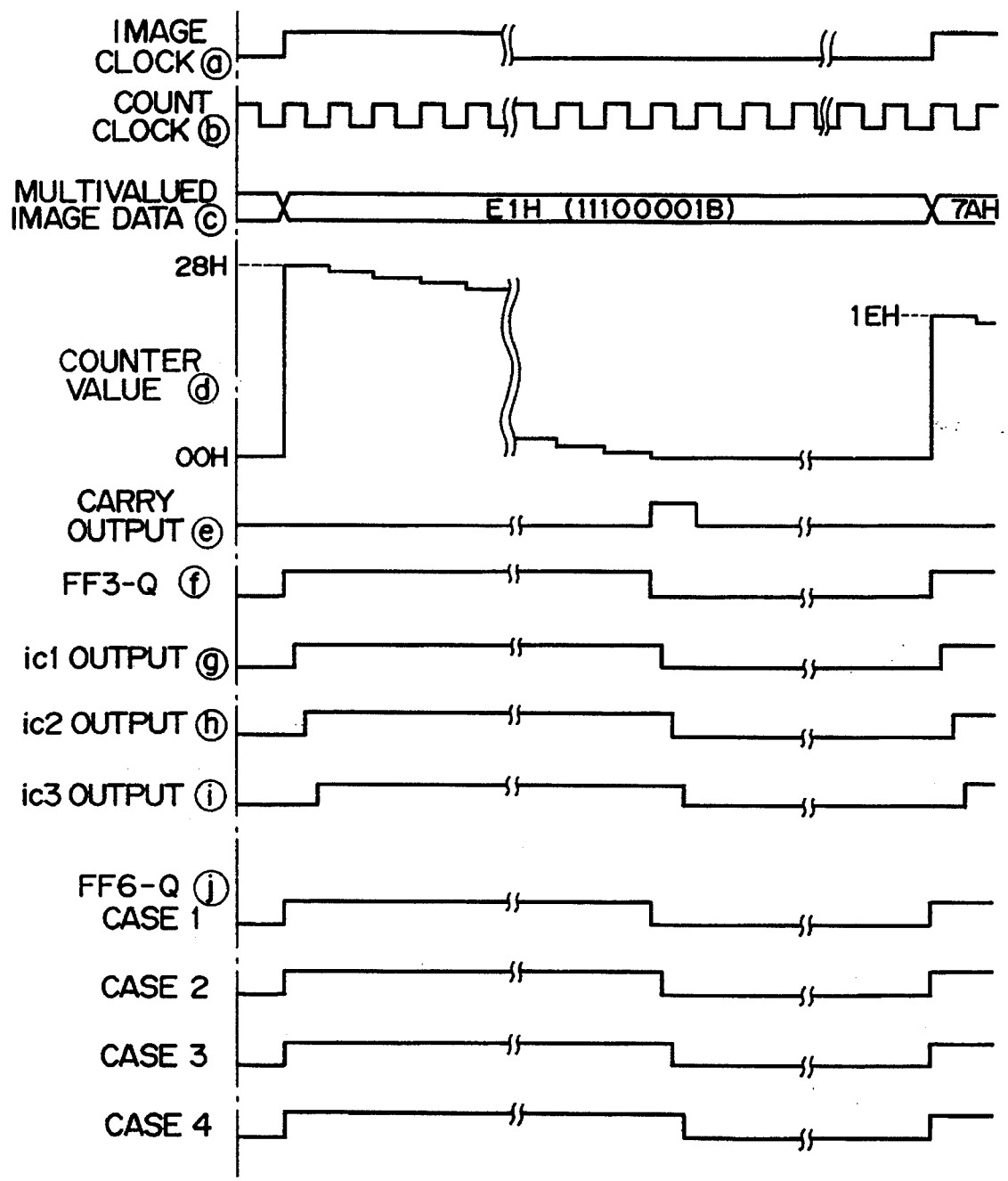
F I G. 16

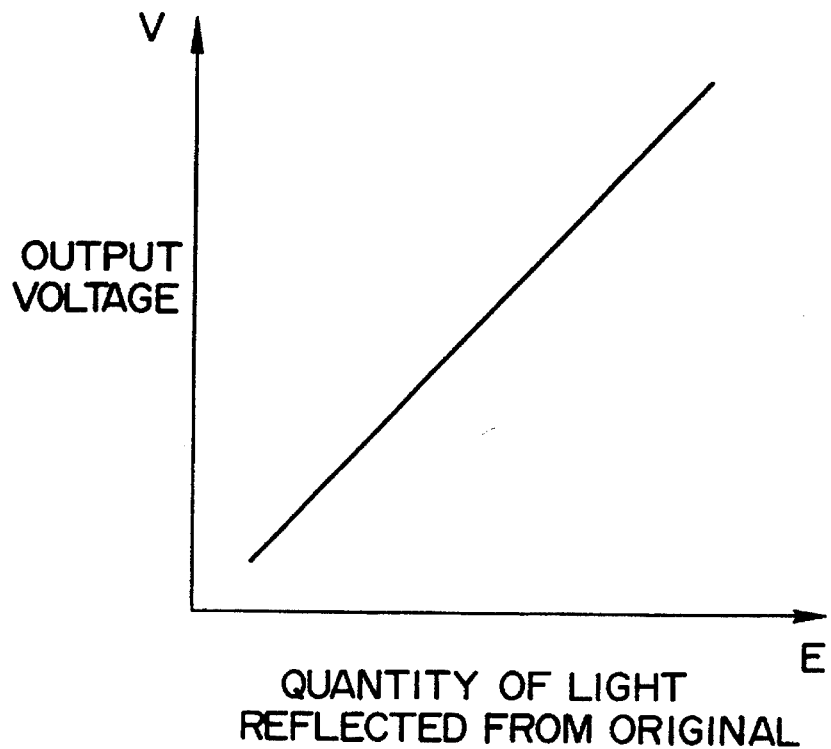
F I G. 23(a)
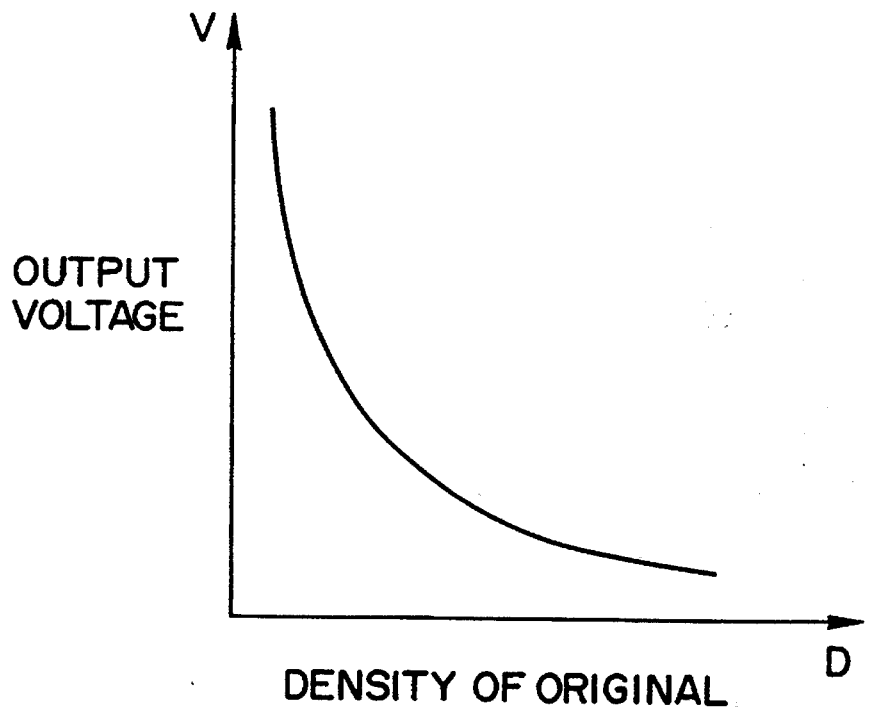
F I G. 23(b)

| DENSITY LEVEL | BIT NO. 0 (MSB) | 1 | 2 | 3 | 4 | 5 | 6 | 7 | 8 (LSB) |
|---|---|---|---|---|---|---|---|---|---|
| | FOR PWM INPUT | | | | | | | FOR LASER LIGHT MODULATION INPUT | |
| 0 (0H) | 0 | 0 | 0 | 0 | 0 | 0 | 0 | 0 | 0 |
| 1 (1H) | 0 | 0 | 1 | 1 | 0 | 0 | 0 | 0 | 1 |
| 2 (2H) | 0 | 0 | 1 | 1 | 0 | 0 | 0 | 1 | 0 |
| 3 (3H) | 0 | 0 | 1 | 1 | 0 | 0 | 0 | 1 | 1 |
| 4 (4H) | 0 | 0 | 1 | 1 | 0 | 1 | 0 | 1 | 1 |
| 5 (5H) | 0 | 0 | 1 | 1 | 1 | 0 | 1 | 1 | 1 |
| 6 (6H) | 0 | 1 | 0 | 0 | 0 | 0 | 0 | 1 | 1 |
| 7 (7H) | 0 | 1 | 0 | 0 | 1 | 0 | 0 | 1 | 1 |
| 8 (8H) | 0 | 1 | 0 | 0 | 1 | 1 | 1 | 1 | 1 |
| 9 (9H) | 0 | 1 | 0 | 1 | 0 | 1 | 1 | 1 | 1 |
| 10 (AH) | 0 | 1 | 1 | 0 | 0 | 0 | 1 | 1 | 1 |
| 11 (BH) | 0 | 1 | 1 | 1 | 0 | 0 | 1 | 1 | 1 |
| 12 (CH) | 1 | 0 | 0 | 0 | 0 | 0 | 0 | 1 | 1 |
| 13 (DH) | 1 | 0 | 0 | 1 | 0 | 1 | 1 | 1 | 1 |
| 14 (EH) | 1 | 0 | 1 | 0 | 1 | 1 | 0 | 1 | 1 |
| 15 (FH) | 1 | 1 | 0 | 0 | 1 | 0 | 0 | 1 | 1 |

FIG. 27

|  | BIT NO. | FOR PWM INPUT | | | | | | | FOR LASER LIGHT MODULATION INPUT | | |
|---|---|---|---|---|---|---|---|---|---|---|---|
| DENSITY LEVEL | | 0 | 1 | 2 | 3 | 4 | 5 | 6 | 7 | 8 | 9 |
| 0 | | 0 | 0 | 0 | 0 | 0 | 0 | 0 | 0 | 0 | 0 |
| 1 | | 0 | 0 | 1 | 1 | 0 | 0 | 0 | 0 | 0 | 1 |
| 2 | | 0 | 0 | 1 | 1 | 0 | 0 | 0 | 0 | 1 | 0 |
| 3 | | 0 | 0 | 1 | 1 | 0 | 0 | 0 | 0 | 1 | 1 |
| 4 | | 0 | 0 | 1 | 1 | 0 | 1 | 0 | 0 | 1 | 1 |
| 5 | | 0 | 0 | 1 | 1 | 1 | 0 | 1 | 0 | 1 | 1 |
| 6 | | 0 | 1 | 0 | 0 | 0 | 0 | 0 | 0 | 1 | 1 |
| 7 | | 0 | 1 | 0 | 0 | 1 | 0 | 0 | 0 | 1 | 1 |
| 8 | | 0 | 1 | 0 | 0 | 1 | 1 | 1 | 0 | 1 | 1 |
| 9 | | 0 | 1 | 0 | 1 | 0 | 1 | 1 | 0 | 1 | 1 |
| 10 | | 0 | 1 | 1 | 0 | 0 | 0 | 1 | 0 | 1 | 1 |
| 11 | | 0 | 1 | 1 | 1 | 0 | 0 | 1 | 0 | 1 | 1 |
| 12 | | 1 | 0 | 0 | 0 | 0 | 0 | 0 | 0 | 1 | 1 |
| 13 | | 1 | 0 | 0 | 1 | 0 | 1 | 1 | 0 | 1 | 1 |
| 14 | | 1 | 0 | 1 | 0 | 1 | 1 | 0 | 0 | 1 | 1 |
| 15 | | 1 | 1 | 0 | 0 | 1 | 0 | 0 | 1 | 0 | 0 |

FIG. 31

IMAGE FORMING APPARATUS, AND MODULATING METHOD THEREIN

This application is a continuation of application Ser. No. 07/590,700 filed Oct. 1, 1990, which is now abandoned.

BACKGROUND OF THE INVENTION

1. Field of the Invention

This invention relates to an image forming apparatus, particularly an image forming apparatus to which multivalued image data is input for forming the data into a visible image which includes half-tones, and to a modulating method used therein.

2. Description of the Prior Art

A pulse-width modulating (PWM) method is known as a technique through which half-tones are expressed based upon an input multivalued image signal.

According to the conventional PWM method, a multivalued input signal is converted into an analog signal which is then compared with an analog waveform (usually a sawtooth waveform) used for comparison purposes, thereby converting the input signal into a pulse-width modulated signal.

This conventional PWM method will now be described with reference to the timing chart shown in FIG. 12.

In the conventional method, as shown in FIG. 12, an input multivalued input image signal VDO is converted into an analog voltage waveform by a D/A converter using an image clock signal VCLK transmitted in synchronism with the input image signal VDO, thereby producing an analog image signal AV.

A sawtooth waveform SAW for comparison purposes generated by an appropriate method and the analog image signal AV are compared by a comparator. If the voltage of the analog image signal AV is greater than the sawtooth waveform SAW for comparison, then an output signal OPD of the above-mentioned comparator is turned "ON". On the other hand, if the voltage of the analog image signal AV is less than the sawtooth waveform SAW for comparison, then the output signal OPD of the above-mentioned comparator is turned "OFF". As a result, the inputted multivalued input image signal VDO is converted into a PWM signal to produce the corresponding recording image signal.

However, with the conventional PWM method of this kind, unstable operation frequently occurs owing to noise and fluctuation of a reference potential for dealing with the analog signal. This makes it difficult to perform a stable conversion to a PWM signal.

Accordingly, an example of an expedient to solve this problem is a method in which the input image signal VDO is compared in the form of a digital signal without being converting into an analog signal. This method is implemented by a circuit having a construction of the kind shown in FIG. 13.

In FIG. 13, a master clock signal CLK is assumed to have a frequency that is n times that of the input image signal VDO.

The input image signal VDO is obtained in a latch circuit 21 in synchronism with an image clock signal VCLK obtained by frequency-dividing a master clock signal CLK using a frequency divider 23. The image signal VDO enters a comparator 24.

Numeral 26 denotes a comparison signal generator which generates a comparison signal CMPD for comparison with the input image signal VDO whenever the master clock signal CLK is produced. The number of bits in the signal CMPD corresponds to the number of bits in the input image signal VDO. The comparison signal CMPD output by the comparison signal generator 26 is synchronized with the master clock signal CLK in a latch 25 before being inputted to the comparator 24.

The comparator 24 compares the level of the input image signal VDO from latch 21 and the level of the comparison signal CMPD from the latch 25, and the result of the comparison is output as the output image signal OPD. When VDO>CMPD holds, the comparator 24 turns the output image signal "ON". This signal serves as the recording signal.

The comparison signal CMPD enters the comparator 24 n times while one input image signal VDO is being applied to this comparator. Consequently, the output image signal OPD is a PWM signal having n times the amount of information possessed by the signal VDO.

FIG. 14 shows a time chart associated with the above-described circuit arrangement for a case where the input image signal VDO is a six-bit signal, n is four and an up/down counter is used as the comparison signal generator 26.

The up/down counter produces a level value obtained by adding or subtracting a predetermined value to or from the immediately preceding level value whenever the master clock signal is generated. The counter has upper- and lower-limit values decided for it. Subtraction starts when the upper-limit value is reached as a result of addition, and addition starts when the lower-limit value is reached as a result of subtraction. This operation is performed repeatedly to produce a pseudo-sawtooth waveform. With this method, items of data are compared with each other so there is no danger of unstable operation of the analog kind.

In the example of the prior art described above, however, the minimum pulse width of the output image signal OPD is decided by the frequency of the master clock CLK, and this is accompanied by a limitation upon the number of tones.

In order to increase the number of tones, the frequency of the master clock should be raised. However, electronic circuit elements have a limit upon their operating frequency, and therefore the upper limit of the usable frequency is determined by the electronic circuit elements employed. As a consequence, a PWM conversion having a high number of tones is difficult to carry out.

In general, high-frequency oscillators and high-speed electronic circuit elements having a high operating frequency limit are expensive, and it is uneconomical to construct all of the circuitry using high-frequency elements merely for the purpose of a high tonality PWM conversion.

A pulse-width modulating circuit is used in such image forming apparatus as laser-beam printers and LED printers.

FIG. 19 is a circuit diagram of a pulse-width modulating circuit in a conventional image forming apparatus, and FIG. 20 is an operation timing chart associated with the circuit of FIG. 19.

Four-bit multivalued image data received from external equipment (not shown) such as a host computer or scanner is loaded in a counter 61 at the leading edge of an image clock signal. The counter 61 is successively counted down by a count clock signal outputted by a count clock generator 62. When the counter output becomes zero, the counter 61 outputs a carry signal. In response, the Q output of a J-K flip-flop 63 is set at the leading edge of the image clock signal. The Q output is reset by generation of the carry signal. This output of the flip-flop 63 is a pulse-width modulated signal. This pulse-width modulated signal enters a laser driver circuit (not illustrated) to turn a laser element on and off, thereby sensitizing a photosensitive drum (not shown) so that half-tone printing may be performed using an electrophotographic technique.

However, in order to express a n-tone density using the conventional method described above, the count clock signal is required to have a frequency that is n times the frequency of the image clock signal. For example, if the image clock signal has a frequency of 1 MHz, a count clock signal having a frequency of 256 MHz is required in order to express 256 tones by an eight-bit multivalued image signal. This means that it is necessary to use a high-speed device such as costly ECL (emitter-coupled logic). Another problem is that radiation noise tends to be produced owing to the high-speed operation.

In a case where a half-tone image is output by a laser-beam printer employing electrophotography, a method is employed in which screen or dither processing or image processing such as pulse-width modulation is performed by a host computer, which has a data generating source, or a controller, etc., and binary-coded data is input to a printer engine section (printer).

In order to deal with the binary-coded data in accordance with this method, a high-efficiency, half-tone data transfer is performed by transfer data compression or the like. On the other hand, with regard to the depth direction of density, it is difficult to obtain the desired stabilized tones, despite the fact that the host computer or controller transmits the same half-tone image data, owing to a delay in the data transmission line, the conditions of the electrophotographic process and differences among equipment.

Furthermore, when different printers are employed using the same host computer or controller, etc., the fact that the correspondence between dither patterns and density differs depending upon the printer means that the host computer or controller requires density correction tables the number of which is equivalent to the number of printers connected. These tables conform to the printers used. A problem arises in it is difficult to achieve compatibility with the printers.

A method is available in which image data having tones, such as a document, is read in by an image reader and developed into a dot image to provide each dot with a value indicating thickness. FIGS. 23(a) and 23(b) are diagrams illustrating the input/output characteristics of a CCD. In a case where a CCD sensor or the like is used as the image input section of the image reader, the density information possessed by the original image is converted into substantially linear voltage information proportional to the light reflected from the original image, as shown in FIG. 23(a). Since the voltage information possesses a logarithmic relation with respect to density [FIG. 23(b)], this signal is subjected to a correction (a γ correction) in the reader section. However, the image undergoes a major change depending upon the extent of the correction.

In addition, depending upon the model type, the host computer possesses various fonts employed by the particular manufacturer. Some host computers tend to express characters boldly, while others express characters more finely.

Thus, there are a large number of varying factors involved in reproducing image information. As a result, when a single system is constructed from such components as a reader, a host computer and a printer, various problems arise. For example, the obtained image may be too faint overall and characters may appear too fine. Conversely, the overall image may be too dark and the characters distorted. In extreme cases, characters appear fine and photographs or graphics appear distorted and without tone. Conversely, characters become too bold to be legible while photographs and graphics appear too faint.

A method that has been proposed to solve these problems involves controlling the exposure time per dot of the exposing beam by pulse-width modulation (PWM), thereby performing the equivalent of density modulation. Attempts have been made to overcome the foregoing problems by subdividing the density modulation steps in order to perform more faithful modulation of density.

However, in order to subdivide the density modulation steps, there is a great increase in the amount of processing performed by the pulse-width modulating section (especially the D/A converter contained in the PWM section). Furthermore, in the method of controlling exposure time per dot of the exposing beam by PWM, a variance in pulse width occurs in a region where pulse width is very small. As a consequence, the printing operation for low density becomes unstable.

SUMMARY OF THE INVENTION

An object of the present invention is to provide a simply constructed, inexpensive image forming apparatus, and a modulating method therein, in which it is possible to form a highly toned image.

Another object of the present invention is to provide an image signal modulating apparatus and method, in which a signal for subdividing one period of a clock is formed and a highly toned image signal is produced.

A further object of the present invention is to provide a pulse-width modulating circuit capable of performing faithful pulse-width modulation even without using a count clock signal having a high frequency.

Still another object of the present invention is to provide an image forming apparatus capable of obtaining an excellent half-tone image at a high or low density.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram showing the detailed construction of a delay circuit shown in FIG. 1;

FIG. 3 is a diagram showing the detailed construction of a changeover circuit shown in FIG. 1;

FIG. 6 is a diagram showing the ratios of conversion signals D1 through D4 with respect to one pixel of an input image signal of the second embodiment;

FIG. 7 is a diagram illustrating the state of multiple-tone density realization by the conversion signals D1–D4 shown in FIG. 6;

FIG. 8 is a diagram showing the relationship between input image signals and output conversion signals D1–D4 from a ROM in the second embodiment of the invention;

FIG. 12 is a diagram for describing analog PWM according to the prior art;

FIG. 16 is an operation timing chart associated with the circuit shown in FIG. 15;

FIG. 23(a) is a diagram showing the relationship between the output voltage of a CCD and the quantity of light reflected form an original;

FIG. 23(b) is a diagram showing the relationship between the output voltage of a CCD and the density of an original;

FIG. 27 is a diagram showing the conversion table of a density producing section in the fifth embodiment;

FIG. 31 is a diagram showing the conversion table of a density producing section in the fifth embodiment.

DESCRIPTION OF THE PREFERRED EMBODIMENTS

Embodiments of the present invention will now be described in detail with reference to the drawings.

FIRST EMBODIMENT

Figure 1:
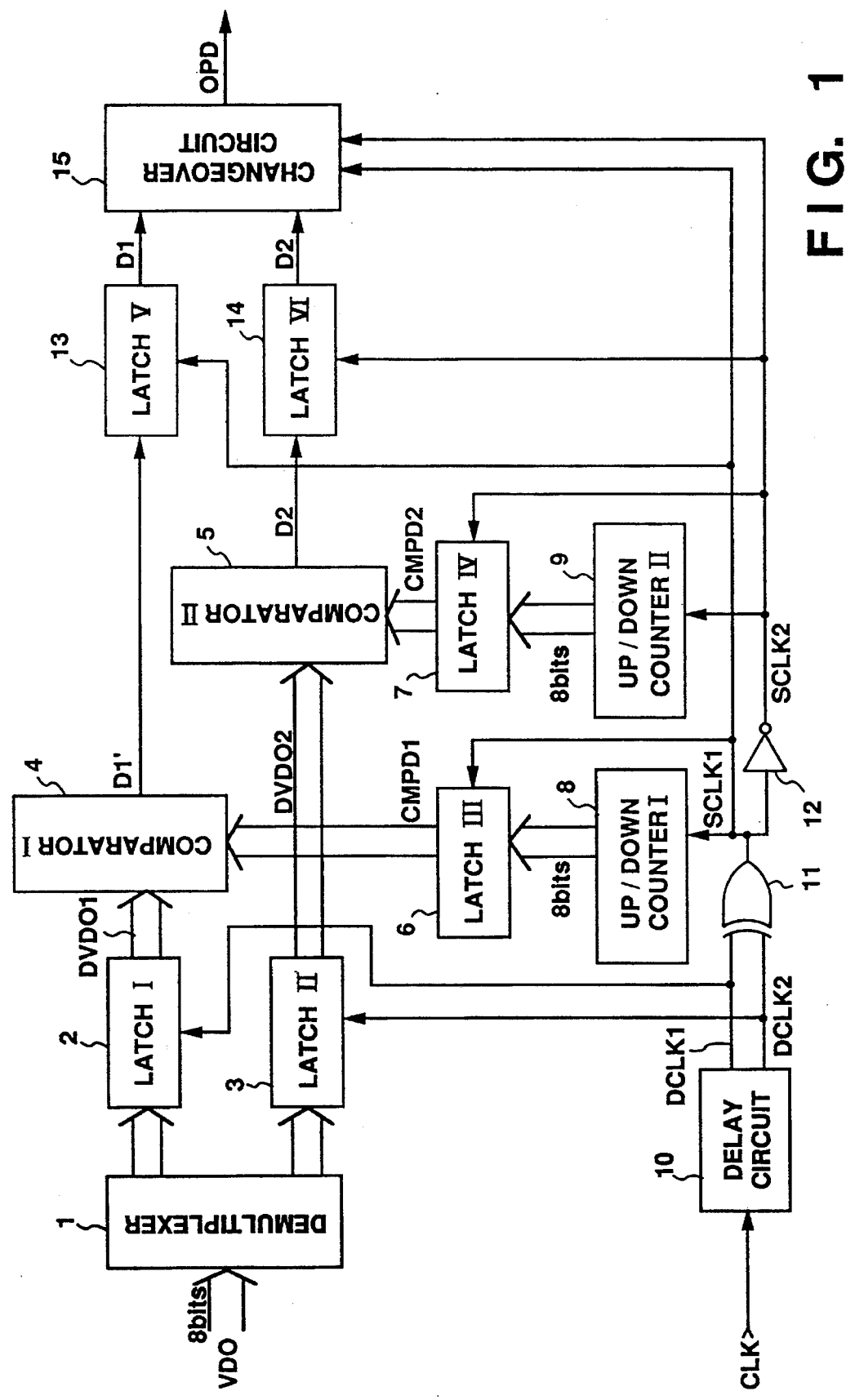
FIG. 1 is a block diagram illustrating a first embodiment of the present invention.

FIG. 1 is a block diagram of an embodiment according to the present invention. This embodiment will now be described in detail with reference to FIG. 1.

In this embodiment, an eight-bit input image signal VDO is pulse-width modulated into an output signal OPD whose minimum pulse width is ¼ the period of the input image signal VDO. According to this embodiment, a master clock CLK has a frequency the same as that of the input signal VDO.

The eight-bit input image signal VDO is split into two paths by a demultiplexer 1. One path enters a latch I 2 and the other enters a latch II 3. These latch circuits are synchronized by respective clocks DCLK 1, DCLK 2 formed from the master clock CLK by a delay circuit 10. The input image signals thus synchronized by the latches I 2, II 3 respectively enter comparators I 4, II 5 as signals DVDO1, DVDO2.

The construction of the delay circuit 10 is shown in FIG. 2. As illustrated in FIG. 2, the delay circuit 10 outputs the master clock CLK intact as DCLK1 and outputs the signal DCLK2 obtained by applying a 90° phase delay to the master clock CLK. The phase delay is applied by a delay element 16.

The clocks DCLK1, DCLK2 from the delay circuit 10 enter an exclusive-OR (EX-OR) gate 11, which produces a switching clock SCLK1 the period whereof is ½ that of the master clock CLK. The clock SCLK1 is inverted by an inverter (NOT) circuit 12, whereby a switching clock SCKL2 is produced. The clock SCLK1 enters an up/down counter I 8, a latch V 13 and a changeover circuit 15, and the clock SCLK2 enters an up/down counter I 29, a latch VI 14 and the changeover circuit 15.

The output of the up/down counter I 8 is counted up or down whenever the clock SCLK1 enters the counter, the output is synchronized with SCLK1 in the latch III 6 and is then delivered to a comparator I 4 as a comparison signal CMPD1.

The up/down counter II 9 and latch IV 7 operate in a similar manner to produce a comparison signal CMPD2 based on SCLK2. The signal CMPD2 is delivered to a comparator II 5.

Thus, as described above, the image data DVDO1 and the comparison signal CMPD1 enter the comparator I 4, in which the two are compared. The output D1' of the comparator 4 becomes logical "1" only when the relation DVDO1≧CMPD1 holds. Similarly, the image data DVDO2 and the comparison signal CMPD2 enter the comparator II 5, and output D2' of the comparator 5 becomes logical "1" only when the relation DVDO2≧CMPD2 holds.

The items of image data D1', D2' enter the latches V 13, VI 14, respectively, where they are synchronized with the respective switching signals SCLK1, SCLK2 and outputted as image data D1, D2. The items of image data D1, D2 enter a changeover circuit 15 where they are alternately selected in successive fashion based on the switching clock signals SCLK1, SCLK2. The successively selected items of data are outputted as serial output image data OPD.

The details of the changeover circuit 15 are shown in FIG. 3.

As shown in FIG. 3, the changeover circuit 15 comprises a J–K flip-flop 17, AND gates 18 and 19, and an OR gate 20.

The J–K flip-flop 17 is set by the leading edge of the switching clock SCLK1, and the J–K flip-flop 17 is reset by the leading edge of the switching clock SCLK2. As a result, the AND gate 19 is opened and the AND gate 18 closed at the timing of the leading edge of signal SCLK1, and the AND gate 18 is opened and the AND gate 19 closed at the timing of the leading edge of signal SCLK2. Consequently, when the signal SCLK2 rises, the image data D1 is output as the output image data OPD, and when the signal SCLK1 rises, the image data D2 is output as the output image data OPD. In other words, the circuit arrangement is such that the serial image data OPD is delivered in an order decided by the latching of the latches V 13, VI 14.

Figure 4:
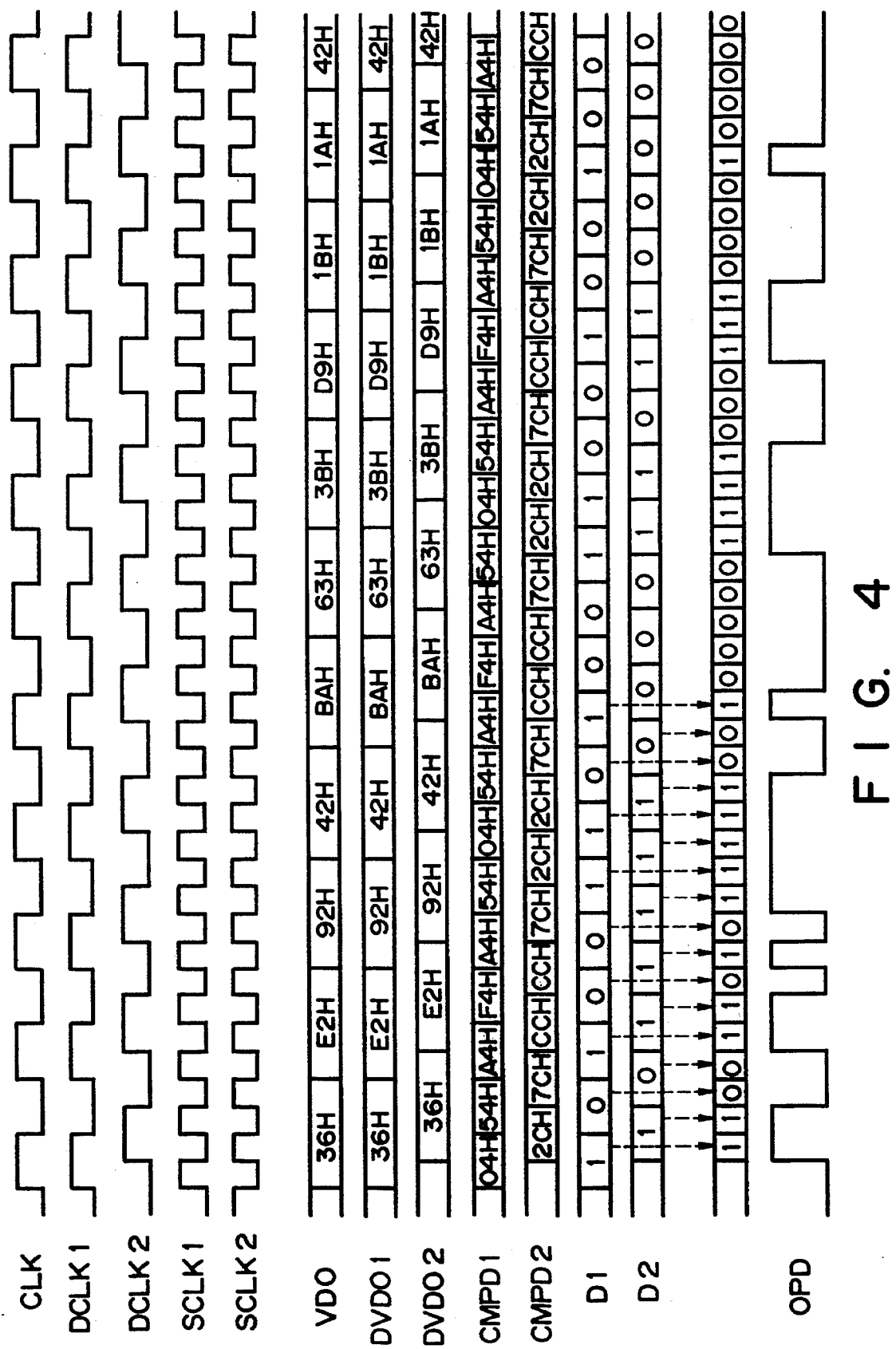
FIG. 4 is an operation timing chart of the present embodiment.

The operation timing of this embodiment is as shown in FIG. 4.

If the frequency of the input image signal VDO in this embodiment is 7 MHz, the signals SCLK1, SCLK2 will have a frequency of 14 MHz and the operating frequency of each circuit element in the changeover circuit 15 will be 28 MHz.

Accordingly, it will suffice to use high-speed operating elements solely for the elements constituting the changeover circuit 15, and the EX-OR gate 11 and inverter circuit 13, which are the circuit elements for producing SCLK1, SCLK2 serving as the control signals of the changeover circuit 15. The other elements need only have a maximum operating frequency on the order of 20 MHz.

It should be noted that the delay clocks SCLK1, SCLK2 which control the output of the image data D1, D2 require to be selected to have a frequency which will prevent initial instability of the leading edges of the image data D1, D2.

In this embodiment, the pulse-width modulating signal is converted by the digital comparator which compares the image signal delayed and the comparison signal. However, it may be converted by comparing the image signal and the comparison signal delayed.

SECOND EMBODIMENT

Figure 5:
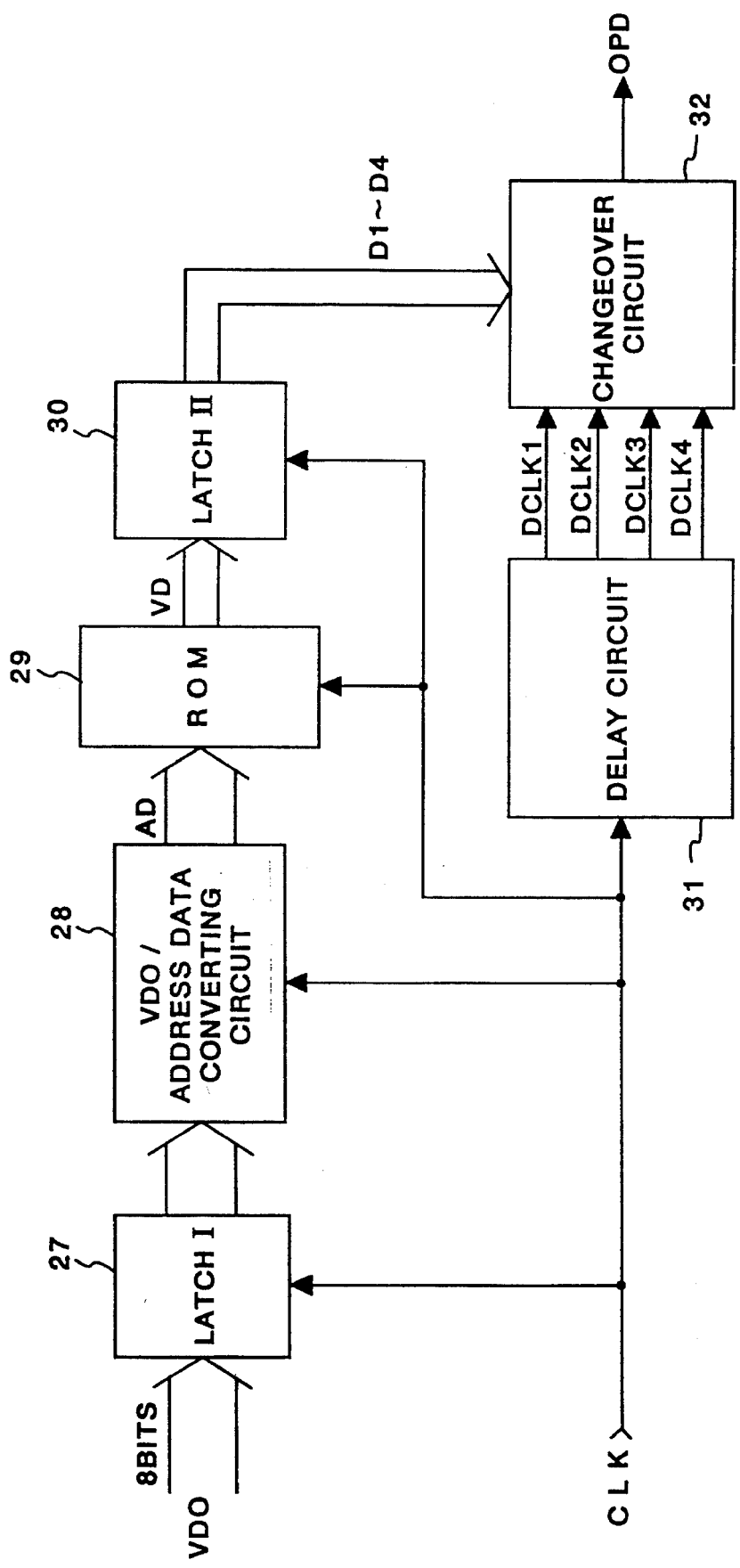
FIG. 5 is a block diagram illustrating a second embodiment of the present invention.

A second embodiment of the invention is illustrated in FIG. 5.

In the second embodiment, one period of the eight-bit input image signal VDO is divided by four to perform pulse-width modulation, just as in the first embodiment described above. However, in the second embodiment, the signal for pulse-width modulation is not divided equally. Instead, weighting is performed by suitably adjusting the delay time of a delay clock DCLK, and the number of tones per input image signal is made 16.

In FIG. 5, the eight-bit input image signal VDO is synchronized with the master clock CLK by a latch I 27, after which the signal is input to a VDO/address data converting circuit 28. The VDO/address data converting circuit 28 modifies the density level value of the input image signal VDO and makes a conversion to address data AD for accessing image data stored in a ROM 29.

The ROM 29 outputs four-bit image data VD from a storage area corresponding to this address data. The four-bit image data VD read out of the ROM 29 enters a latch II 30 to be synchronized with the master clock CLK again. The image data VD enters a changeover circuit 32 as four binary parallel signals D1, D2, D3, D4 starting from the largest digit.

The relationship between the input image signal VDO and the image data VD (D1–D4) read out of the ROM 29 will now be described.

In this embodiment, one pixel of the input image signal VDO is divided so that the ratios shown in FIG. 6 will be established. The items of image data D1–D4 are assigned to these divided pixels of different size. If each divided pixel is printed when the value of the assigned image data is "1", then combining the items of image data D1–D4 will make it possible to express 16 tones of density per pixel of VDO.

In general, it is desired that actual image density and the density level value of the image data VD be proportionally related. However, this depends greatly upon the way in which the pixel is divided. In the present embodiment, dividing the pixel in the manner shown in FIG. 6 is for the purpose of approaching this proportional relationship.

If possible density level values D based on the combination of image data D1–D4 are expressed by assigning numbers of 0 to 15 starting from the smallest value, and if S denotes the percentage of the recording area which a certain density level value occupies in one pixel of VDO, the relationship between D and S can be expressed as a fairly good proportional relationship of the kind shown in FIG. 7.

In the VDO/address data converting circuit 28 and ROM 29, the arrangement is such that VD (D1–D4) shown in FIG. 8 is output from the ROM 29 with respect to the density level value of the input image signal VDO in order that the 16-tone VD shown in FIGS. 6, 7 is output with respect to the input signal VDO.

On the basis of delay clocks DCLK1–DCLK4 from a delay circuit 31, a changeover circuit 32 successively produces the output OPD one bit at a time starting from the most significant bit of the image data VD within one period of the input image signal.

Figure 9:
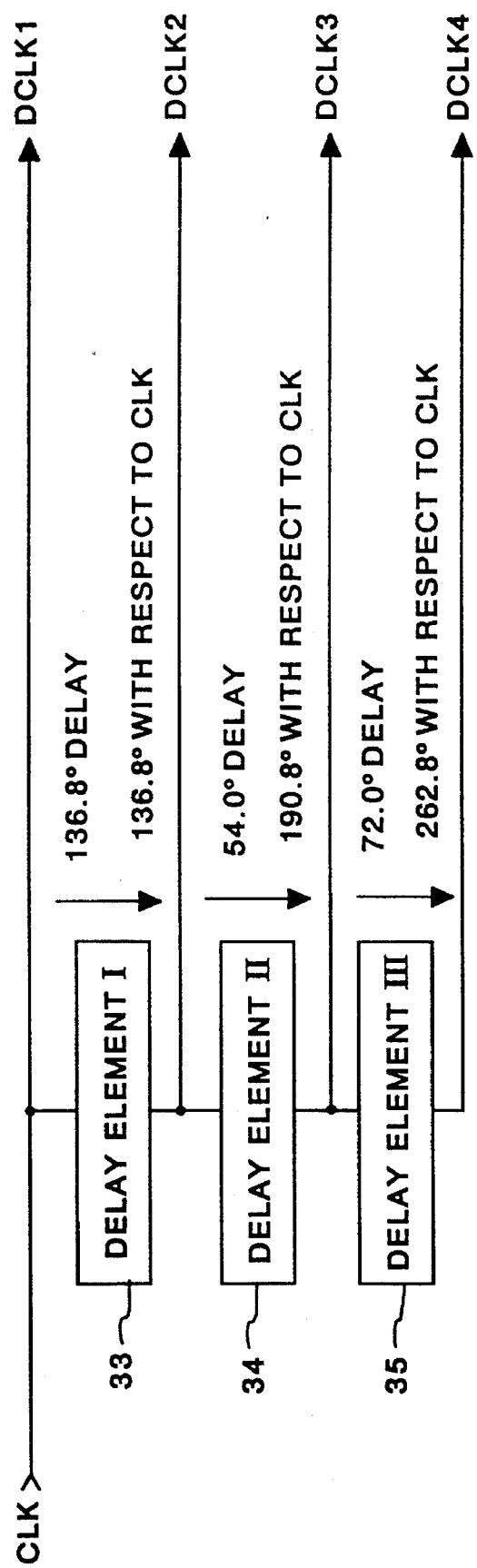
FIG. 9 is a diagram showing the detailed construction of a delay circuit shown in FIG. 5.

The details of the delay circuit 31 are shown in FIG. 9.

As shown in FIG. 9, the delay circuit 31 comprises delay elements I 33 through III 35. The delay element I 33 delays its input signal by 136.8° (38% of one cycle), the delay element II 34 delays its input signal by 54° (15% of one cycle), and the delay element III 35 delays its input signal by 72° (20% of one cycle). As a result, the delay circuit 31 successively delays the master clock CLK applied thereto, thereby producing the delay clocks DCLK1–DCLK4, among which DCLK2 through DCLK4 each have a phase different from that of the master clock CLK.

More specifically, DCLK1 is in phase with the master clock CLK, DCLK2 is delayed by 136.8°, DCLK3 is delayed by 190.8°, and DCLK4 is delayed by 260.8°.

Figure 10:
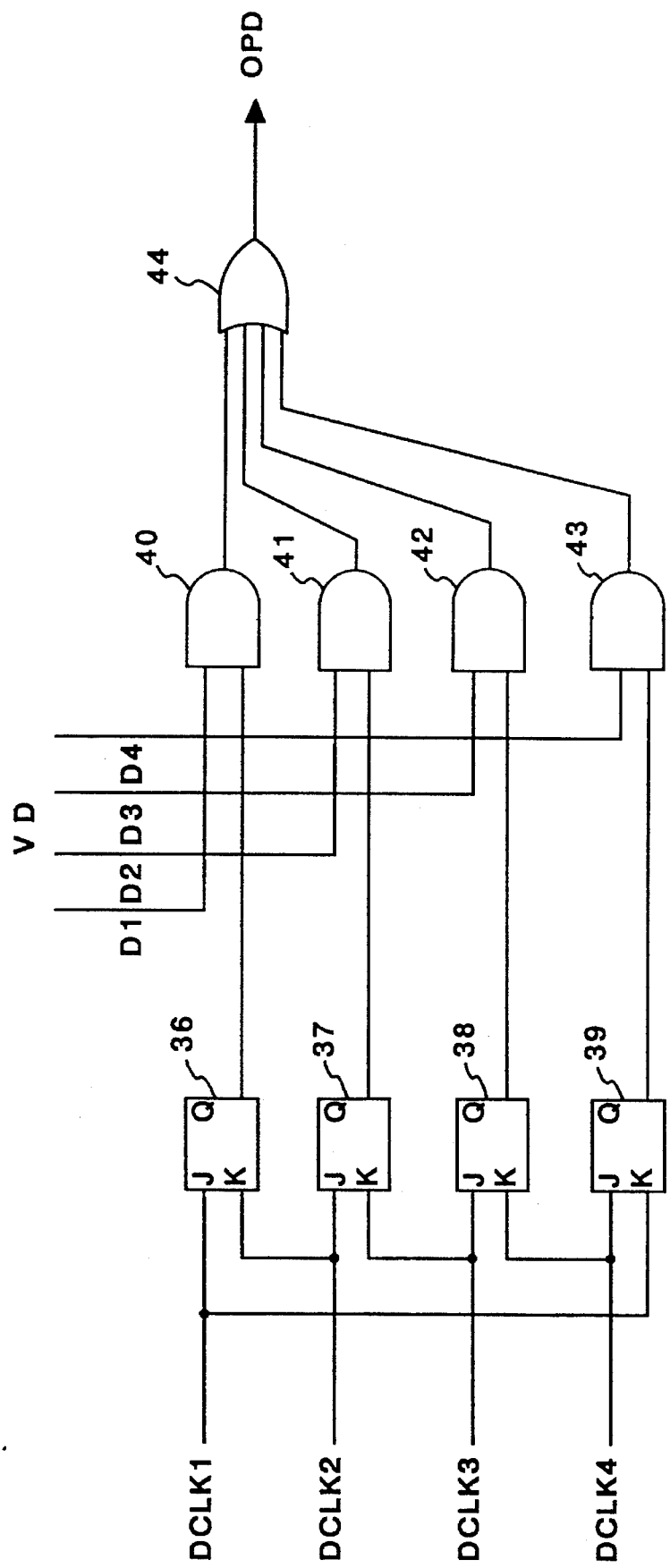
FIG. 10 is a diagram showing the detailed construction of a changeover circuit shown in FIG. 5.

The four delay clocks DCLK1–DCLK4 produced are output to the changeover circuit 32. The details of the changeover circuit 32 are shown in FIG. 10.

The changeover circuit 32 is adapted to convert (pulse-width modulate) the four-bit parallel data D1–D4 from the latch II 30 into a serial pulse-width signal by delay clocks DCLK1 through DCLK4. The delay clock DCLK1 input to the changeover circuit 32 places a J–K flip-flop 36 in the set state at the leading edge of the signal, thereby opening an AND gate 40 so that the image data D1 is delivered as the output signal ODP through an OR gate 44. Next, when the delay clock DCLK2 rises, the J–K flip-flop 36 is placed in the reset state, thereby clocking the AND gate 40. In other words, the output of the image data D1 continues until the moment the AND gate 40 is closed.

In response to the rise of the delay clock DCLK, a flip-flop 37 is placed in the set state, thereby opening an AND gate 41 to deliver the image data D2 as the output signal ODP. The output of D2 continues until the delay clock DCLK3 rises.

Thenceforth, and in similar fashion, D3 is output as the output signal ODP until DCLK4 rises, and D4 is output as the output signal ODP until DCLK1 rises.

Figure 11:
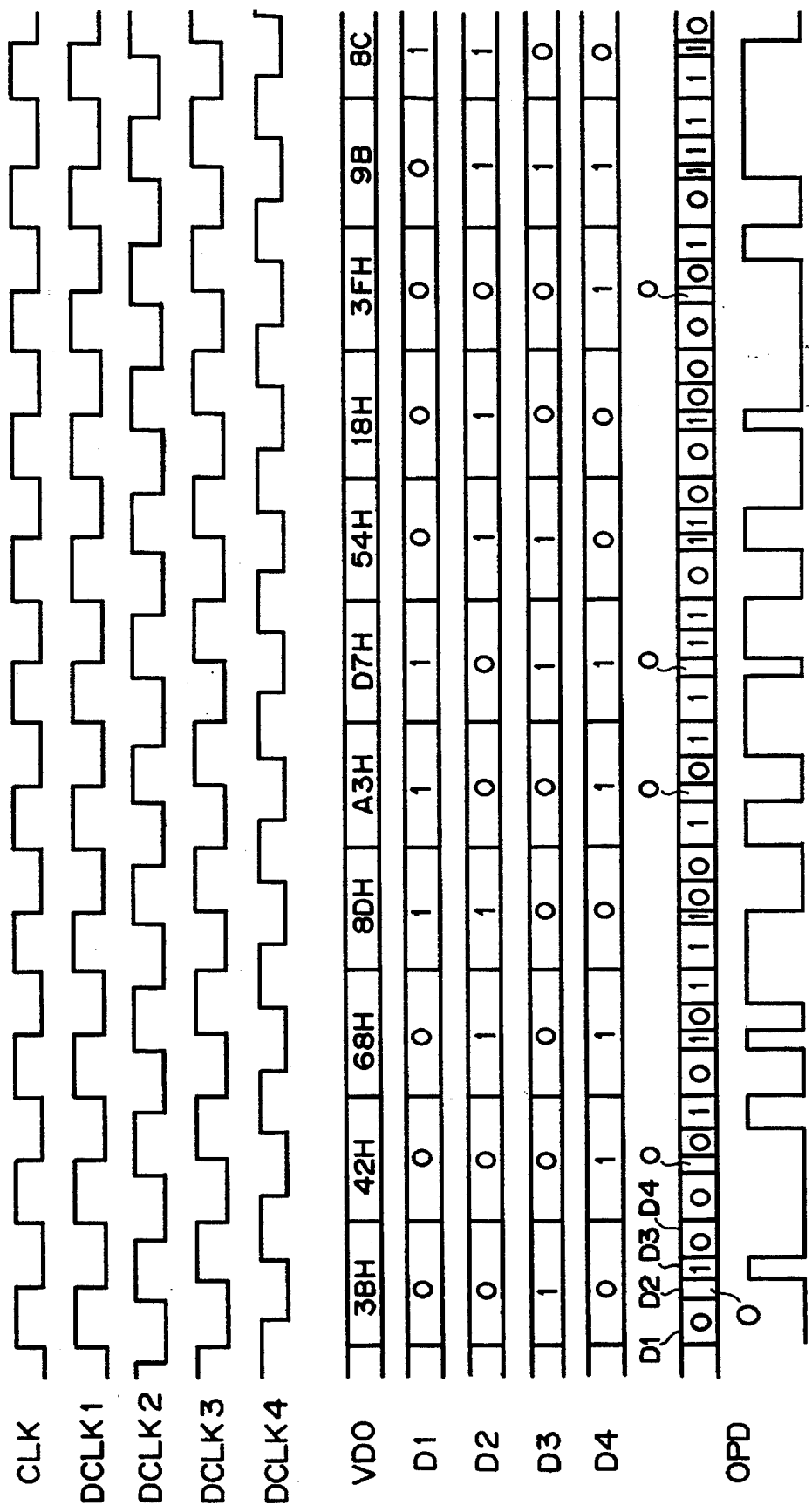
FIG. 11 is an operation timing chart of the second embodiment.
Figure 13:
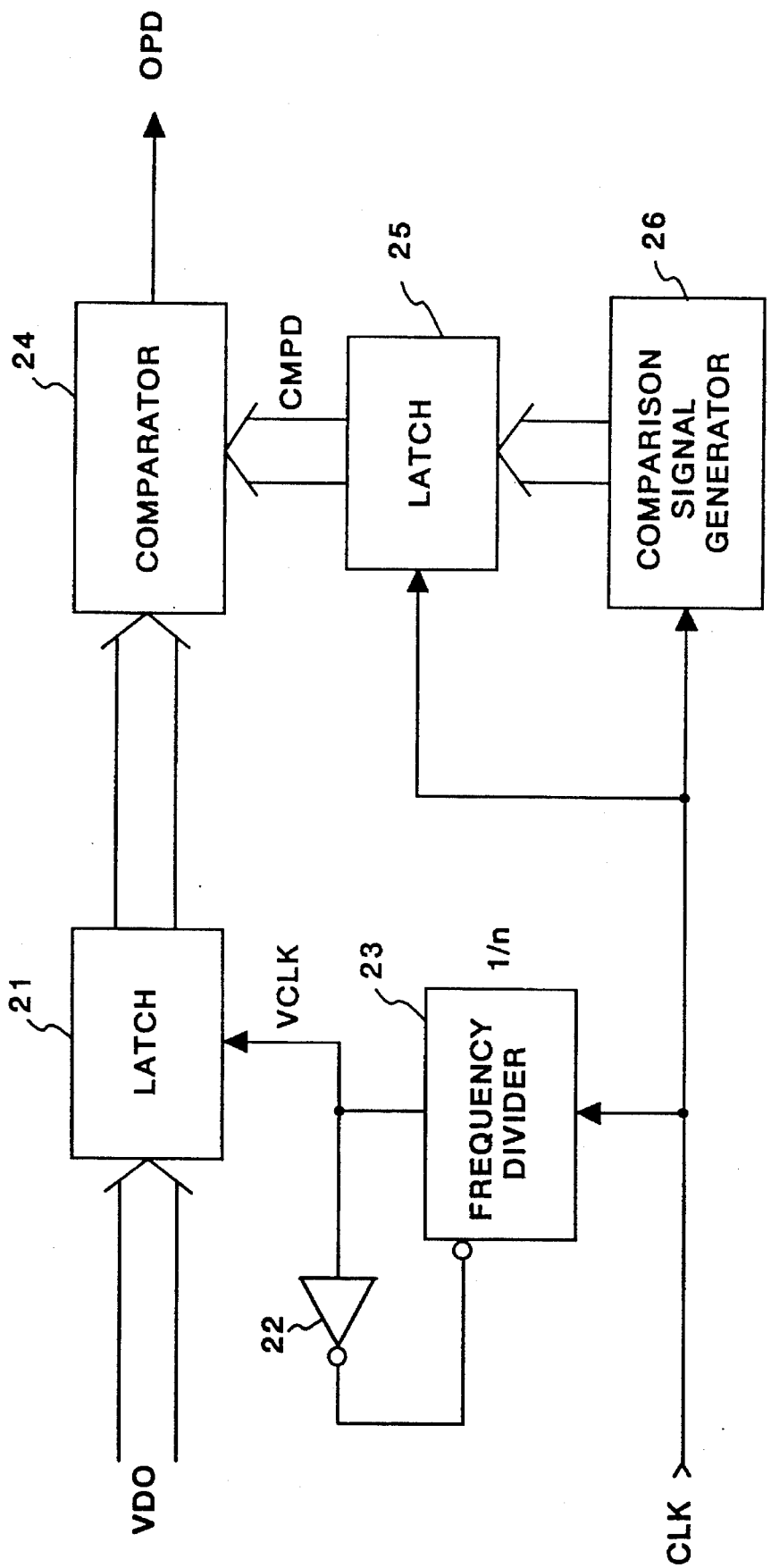
FIG. 13 is a block diagram of digital PWM according to the prior art.
Figure 14:
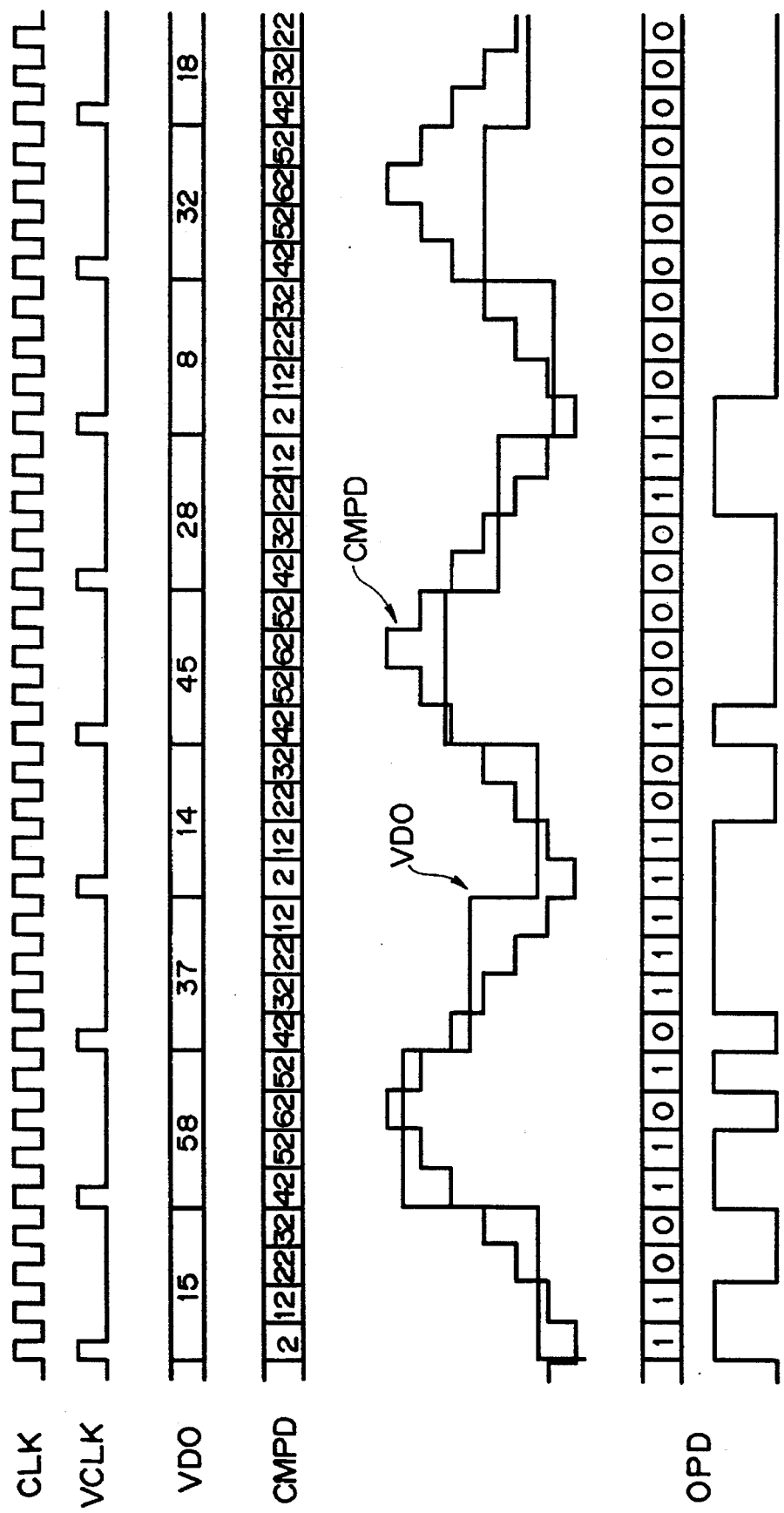
FIG. 14 is a timing chart of the digital PWM of FIG. 13.

FIG. 11 illustrates the operation timing of pulse-width modulation of the input image signal VDO of the second embodiment.

The procedure of image data transmission by the changeover circuit 32 corresponds to carrying out weighting by changing the transmission time with regard to each of the items of image data D1–D4 by means of the delay clocks DCLK1–DCLK4.

By adopting the arrangement described above, the maximum operating frequency of the circuit elements of changeover circuit 32 will be about 46.7 MHz if the input frequency of the input image signal VDO is 7 MHz, by way of example. As a result, it will suffice to use elements which operate stably at 50 MHz as the elements of the changeover circuit.

As long as stable operation of the changeover circuit elements is assured, the present invention is not limited as to the number of delay clock signals and the phase differences among them.

In addition, there is no limitation as to the number of bits constituting the input image signal or the number of items of image data inputted to the changeover circuit.

In accordance with this embodiment, as described above, the input image signal can be subjected to pulse-width modulation in a time unit shorter than the period of the master clock signal without altering the master clock period within one period of the input image signal.

Furthermore, a multivalued input recording is converted into a plurality of different signals having lengths of time shorter than the period of the master clock signal without altering the period of the master clock signal within one period of the input image signal, thereby making it possible to perform pulse-width modulation in accordance with a predetermined weighting.

In this embodiment, the delay circuit delays the clock applied thereto. However, it may delay the respective image data D1–D4.

Thus, in accordance with the present invention as described above, there is provided an image signal converting method in which a high-tone recording signal can be obtained without raising the frequency of the master clock signal, and in which a high resolution can be realized economically by using expensive, high-speed operating circuit elements solely within the minimum necessary range.

THIRD EMBODIMENT

A third embodiment relates to a case where a delay-line circuit is used as the delay circuit.

Figure 15:
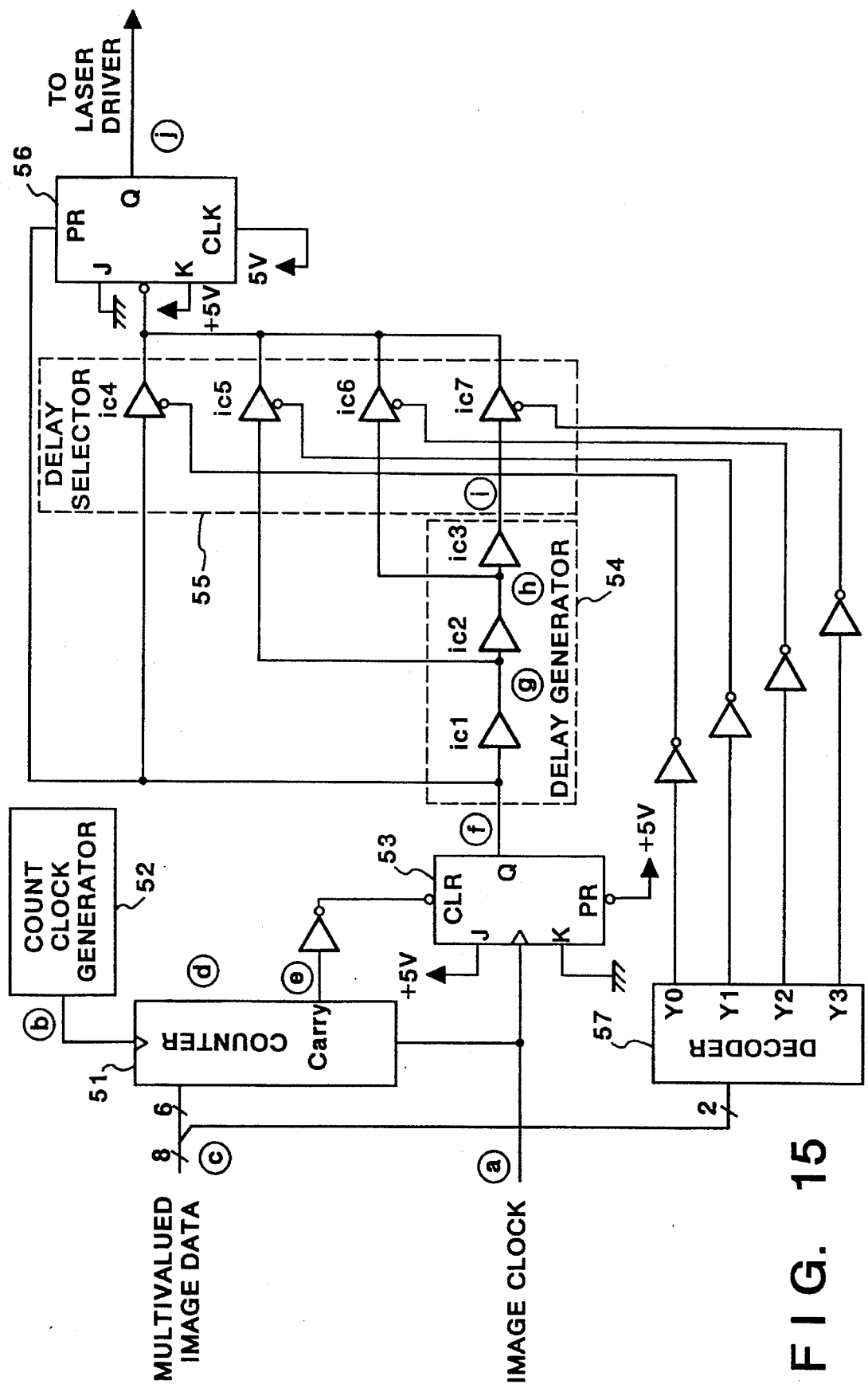
FIG. 15 is a circuit diagram of a pulse-width modulating circuit of a third embodiment employed in an image forming apparatus.

FIG. 15 is a circuit diagram of a pulse-width modulating circuit of a third embodiment employed in an image forming apparatus, and FIG. 16 is an operation timing chart associated with the circuit shown in FIG. 15.

In FIG. 15, the six most significant bits of eight-bit multivalued image density data ⓒ enter a counter 51 and the two least significant bits of this data enter a decoder 57. When an image clock signal ⓐ rises, the most significant six-bit data is loaded in the counter 51 and a J–K flip-flop 53 is set, as a result of which the Q output ⓕ attains a high level. Thereafter, the counter 51 is counted down by a count clock signal ⓑ output from a count clock generator 52. Here the clock frequency of the count clock signal ⓑ is 64 ($2^6$) times that of the image clock signal ⓐ, and both are in synchronism. When the count value ⓓ in counter 51 becomes "0", a carry signal ⓔ is output and the J–K flip-flop 54 is cleared along with the generation of the carry signal ⓔ. As a result, the Q output ⓕ of this flip-flop attains a low level. Thus, the greater the contents of the six most significant bits of the multivalued image data, the longer the time during which the Q output ⓕ of the J–K flip-flop 53 is at the high level.

Furthermore, the leading edge of the Q output ⓕ of J–K flip-flop 53 sets a J–K flip-flop 56, the Q output ⓙ of which attains the high level. The Q output ⓕ of J–K flip-flop 53 enters a delay generator 54, within which this signal is delayed a predetermined length of time by each of three chained buffer circuits ic1–ic3. As a result, three pulse signals ⓖ, ⓗ, ⓘ each differing in phase are obtained, as shown in FIG. 16.

Meanwhile, a decoder 57 decodes the two least significant bits of the multivalued image data and outputs, from a respective one of four terminals $Y_0$– $Y_3$, a high-level decoded signal conforming to the input data of value 0 through 3. These decoded signals enter a delay selector 55 in which the outputs of the decoder 57 render conductive only those buffer circuits ic4, ic5, ic6, ic7 that correspond to the high level. In other words, only buffer circuit ic4 is rendered conductive when input data=0 holds, only buffer circuit ic5 is rendered conductive when input data=1 holds, only buffer circuit ic6 is rendered conductive when input data=2 holds, and only buffer circuit ic7 is rendered conductive when input data=3 holds. As a result, the clock input for resetting the J–K flip-flop 56 has its trailing edge changed in dependence upon the size of the least significant two-bit data, and therefore the overall pulse width of the Q output ⓙ of the J–K flip-flop 56 also is rendered faithful to the input eight-bit multivalued image data. The foregoing is illustrated as waveforms of cases 1 through 4 in FIG. 16.

Further, the Q output ⓙ of the J–K flip-flop 56 enters a laser driver (not shown), thereby turning the laser beam on and off to sensitize a photosensitive drum (not shown). Half-tone printing is performed using electrophotography.

General-purpose logic IC74LS07 or the like having a long delay time is used as the buffer circuits ic1–ic3 of the delay generator 54, and logic 74AS08 or 74AS32 or the like having a sufficiently short delay time in comparison with the logic 74LS07 is used as the delay selector 55 or J–K flip-flop 56.

It is permissible to use delay line elements instead of the buffer circuits ic1–ic3 of FIG. 15. Such an expedient would reduce a variance in delay from one element to another and improve accuracy.

FOURTH EMBODIMENT

A fourth embodiment relates to a case where a slope-forming circuit as the delay circuit.

Figure 17:
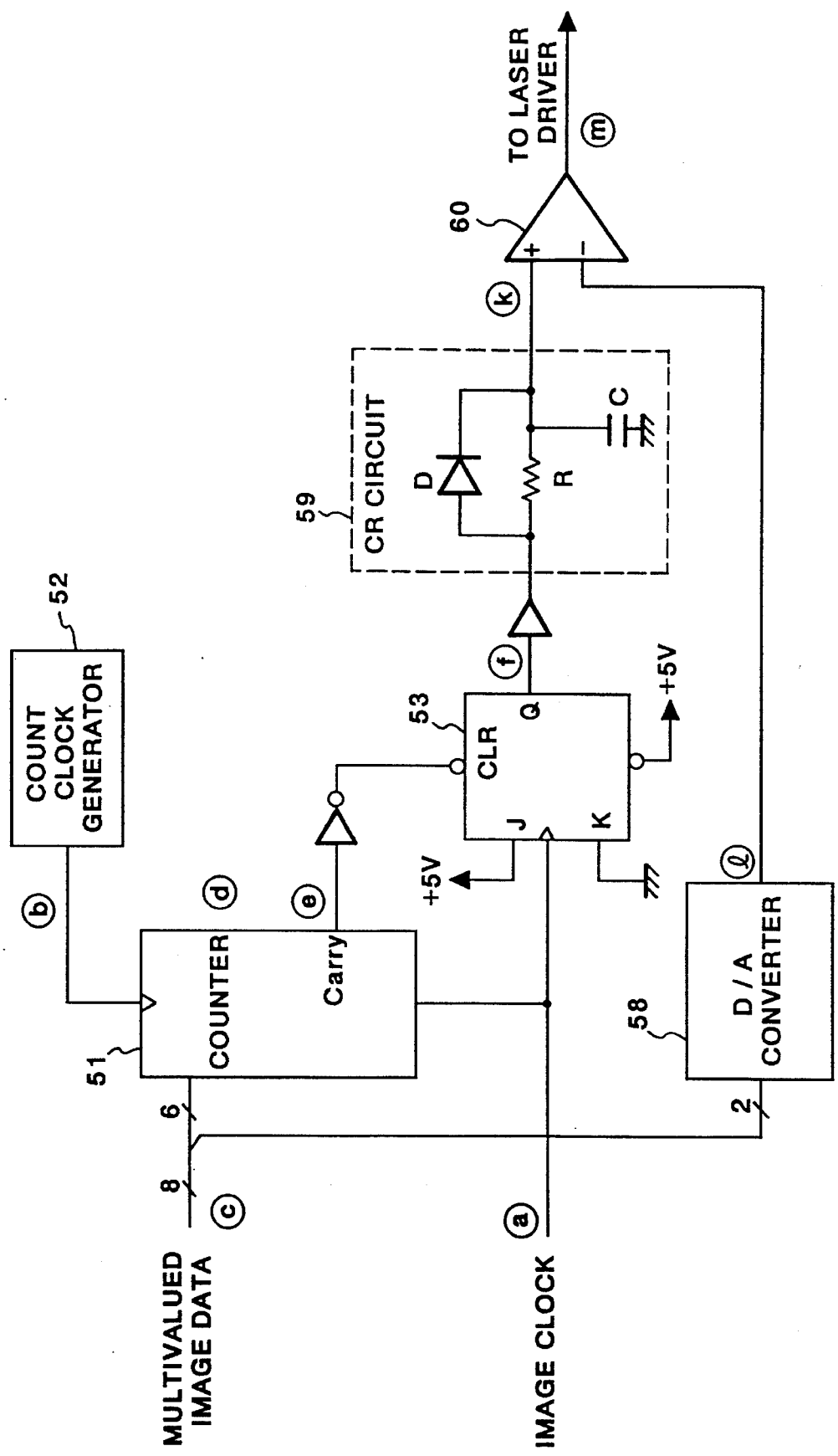
FIG. 17 is a circuit diagram of a pulse-width modulating circuit of a fourth embodiment employed in an image forming apparatus.
Figure 18:
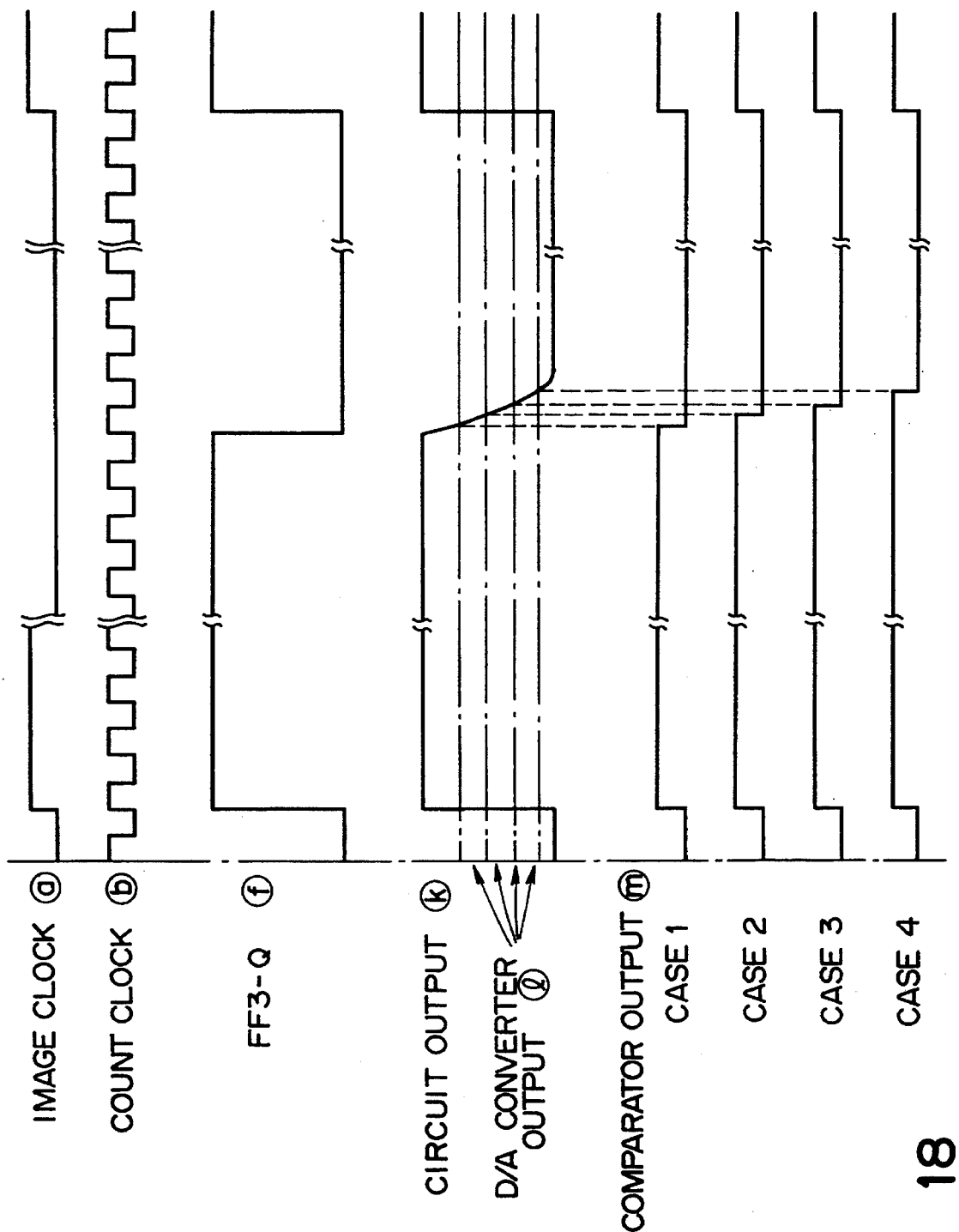
FIG. 18 is an operation timing chart associated with the circuit shown in FIG. 17.
Figure 19:
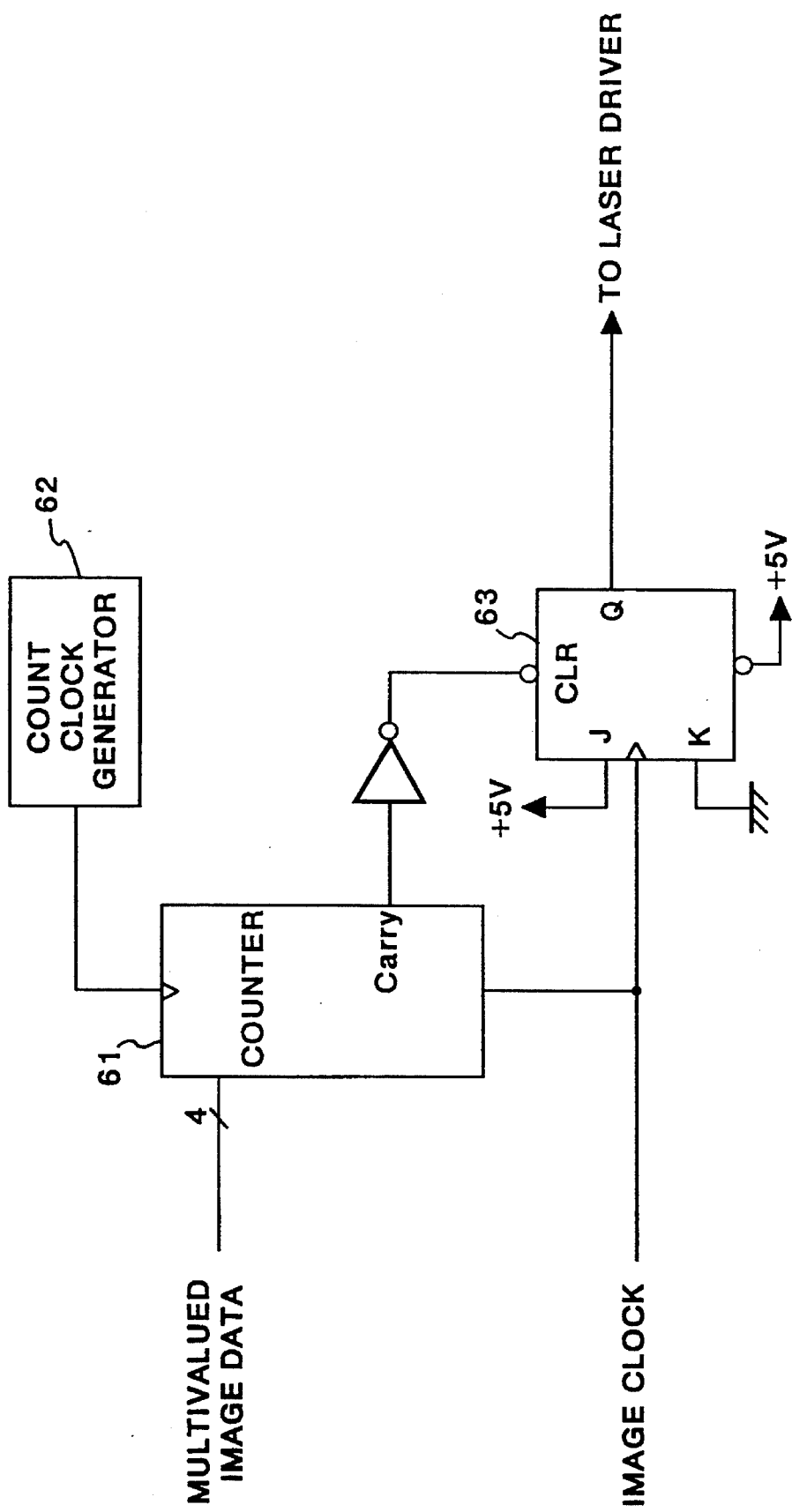
FIG. 19 is a circuit diagram showing a pulse-width modulating circuit of a conventional image forming apparatus.
Figure 20:
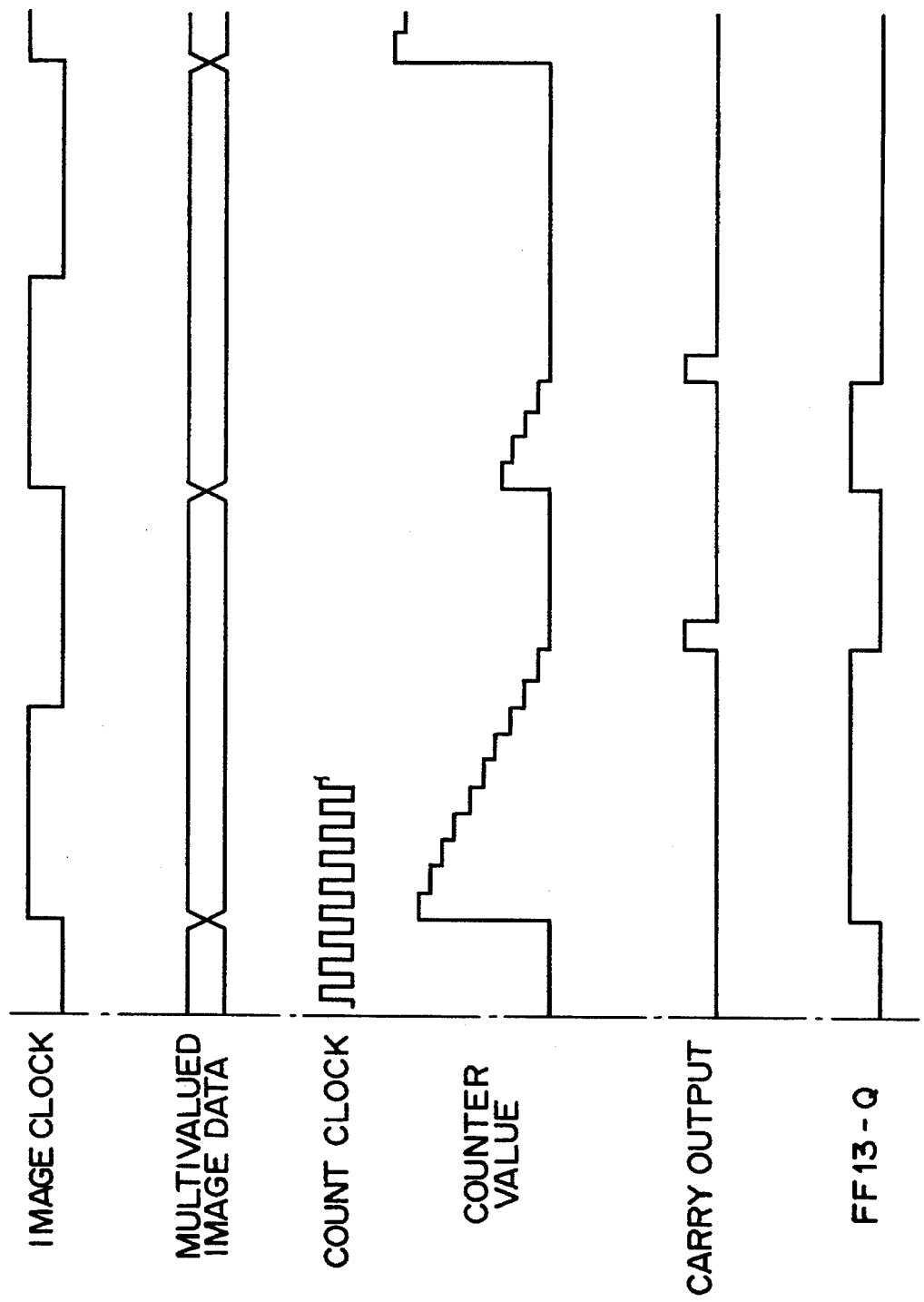
FIG. 20 is an operation timing chart associated with the circuit shown in FIG. 19.

FIG. 17 is a circuit diagram of a pulse-width modulating circuit of a fourth embodiment employed in an image forming apparatus, and FIG. 18 is an operation timing chart associated with the circuit shown in FIG. 17. Portions identical with those of the third embodiment are designated by like reference characters and need not be described again.

In FIG. 17, numeral 59 denotes a CR (integrating) circuit which smoothens the trailing edge portion of the pulse signal ⓕ to form this edge into a slope. More specifically, when the pulse signal ⓕ rises, a diode D is by-passed and a capacitor C is charged rapidly. When the pulse signal ⓕ decays, the diode D is cut off, as a result of which the capacitor C gradually discharged via a resistor R. Accordingly, the output of the CR circuit 59 is as illustrated by signal ⓚ.

Meanwhile, the two bits of least significant data enter a D/A converter 58 and are converted into a signal ⓘ the voltage level of which successively diminishes in conformity with the value 0–3 of this least significant two-bit data. Numeral 60 denotes a high-speed analog comparator circuit for comparing the signal ⓚ and the signal ⓘ. The comparator 60 outputs a pulse signal ⓜ only when ⓚ>ⓘ holds. As a result, the overall pulse width of the output ⓜ of comparator circuit 60 also is rendered faithful to the input eight-bit multivalued image data. The foregoing is illustrated as waveforms of cases 1 through 4 in FIG. 18.

In the embodiment, a case is described in which the trailing edge of the pulse signal ⓕ formed by counting the clock is extended. However, the invention is not limited to this embodiment. For example, it is possible to adopt an arrangement in which a pulse signal ⓕ' larger by one count is formed by counting the clock, and the leading edge of the signal ⓕ' is delayed, thereby reducing the pulse width. In terms of FIG. 17, this can be accomplished by connecting the diode D so that the polarities thereof are reversed. The same holds true for FIG. 15 as well.

Thus, in accordance with the present invention as described above, the frequency of the count clock signal can be reduced, the cost of the devices used can be lowered and radiation noise can be reduced as well. Accordingly, excellent effects can be obtained if the present invention is employed in an image forming apparatus such as a laser-beam printer or LED printer, etc.

FIFTH EMBODIMENT

A case in which the foregoing pulse-width modulating circuit is employed in a printer device serving as an image forming apparatus will now be described with reference to the related drawings.

Figure 21:
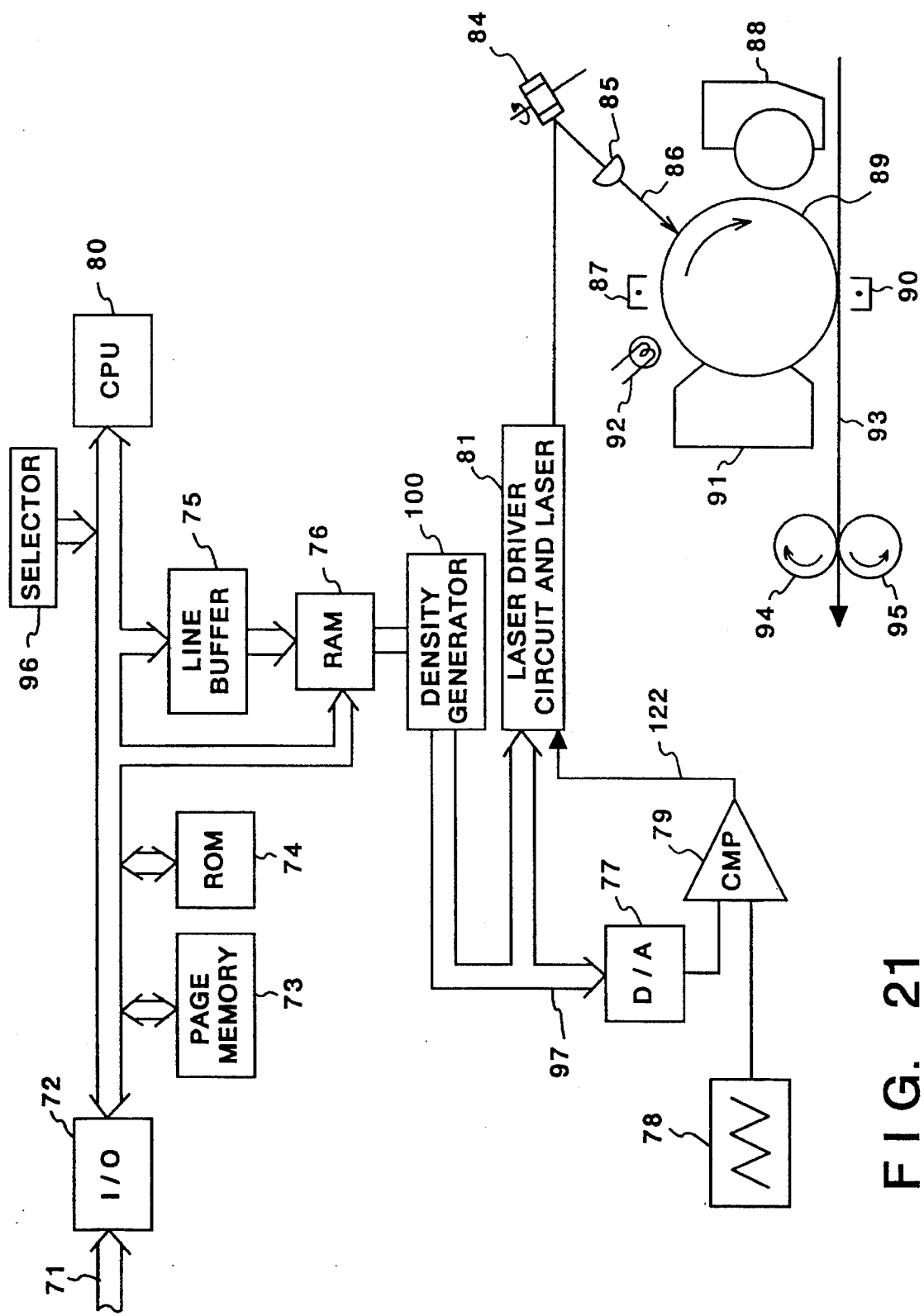
FIG. 21 is a block diagram showing a laser-beam printer in a fifth embodiment.

FIG. 21 is a block diagram of a printer device according to the fifth embodiment of the invention. The essentials of processing will now be described.

Multivalued digital image data 71 (one pixel, four bits=16 tones) outputted by a data generating source (such as a host computer or image reader), not shown, is stored in a page memory 73 of a printer through an I/O port 72. Image data arrayed in the page memory 73 as multivalued video data of four-bit data is sequentially read out to a line buffer 75 with the start of printing, and synchronization is achieved with the video signal. The image data is then subjected to a digital/digital conversion in a RAM 76, which is a look-up table.

Figure 22:
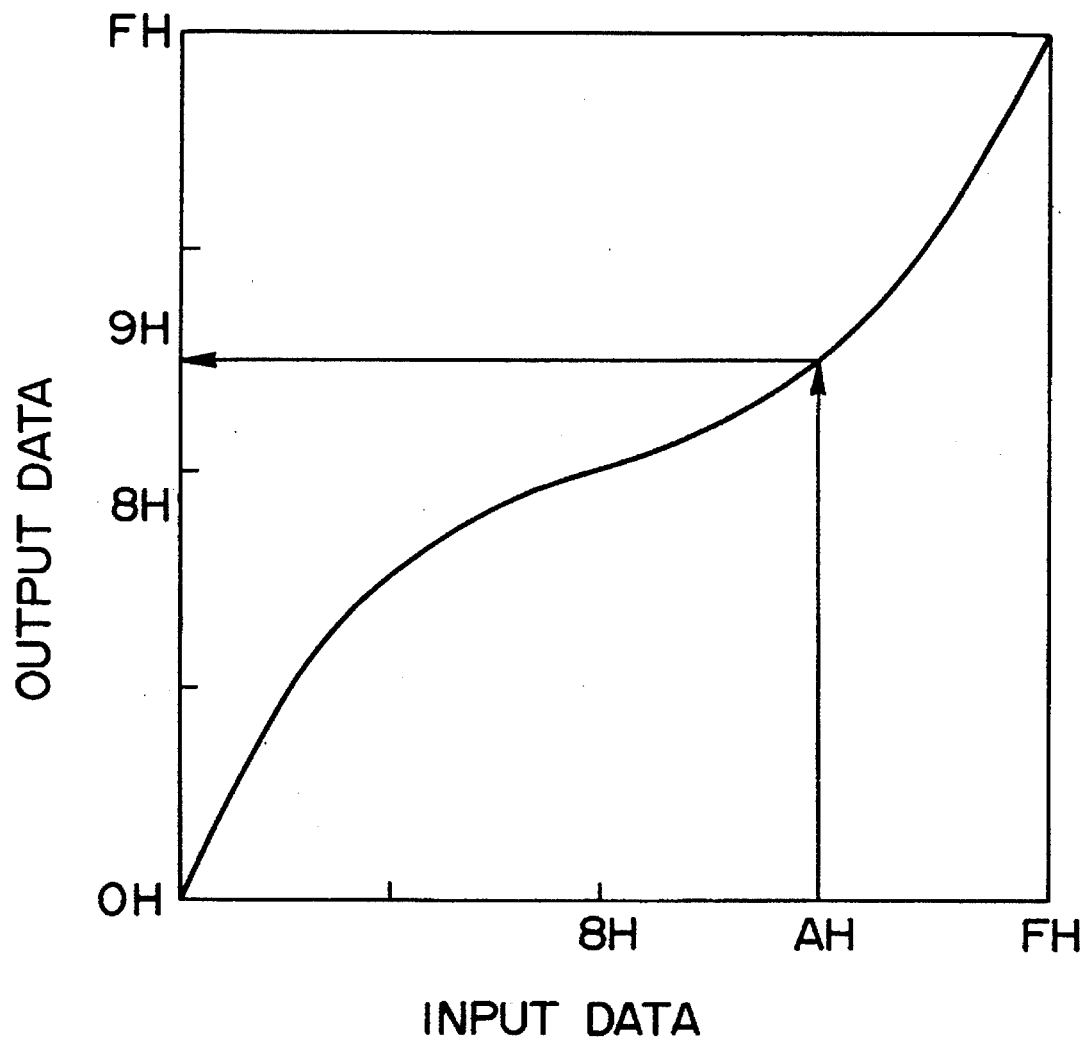
FIG. 22 is a diagram showing the conversion characteristics of a look-up table according to the fifth embodiment.

An example of the contents of the look-up table in RAM 76 is illustrated in FIG. 22. The look-up table is so adapted that input data is applied as an address line of the RAM 76 and data written at this address is output as output data.

For example, in FIG. 22, when AH (where H indicates a hexadecimal number) is inputted as density data of the image, data obtained by a conversion to 9H is output.

In FIG. 21, numeral 96 denotes a selector. In dependence upon the state of the selector 96, a CPU 80 reads out one item of look-up table information previously stored in a ROM 74, and the CPU loads this data in the RAM 76. The curve information shown in FIGS. 24(a) and 24(b) has already been stored in the ROM 74. In order to obtain greater precision, however, a greater amount of curve information may be stored in the ROM if desired.

Figure 24A:
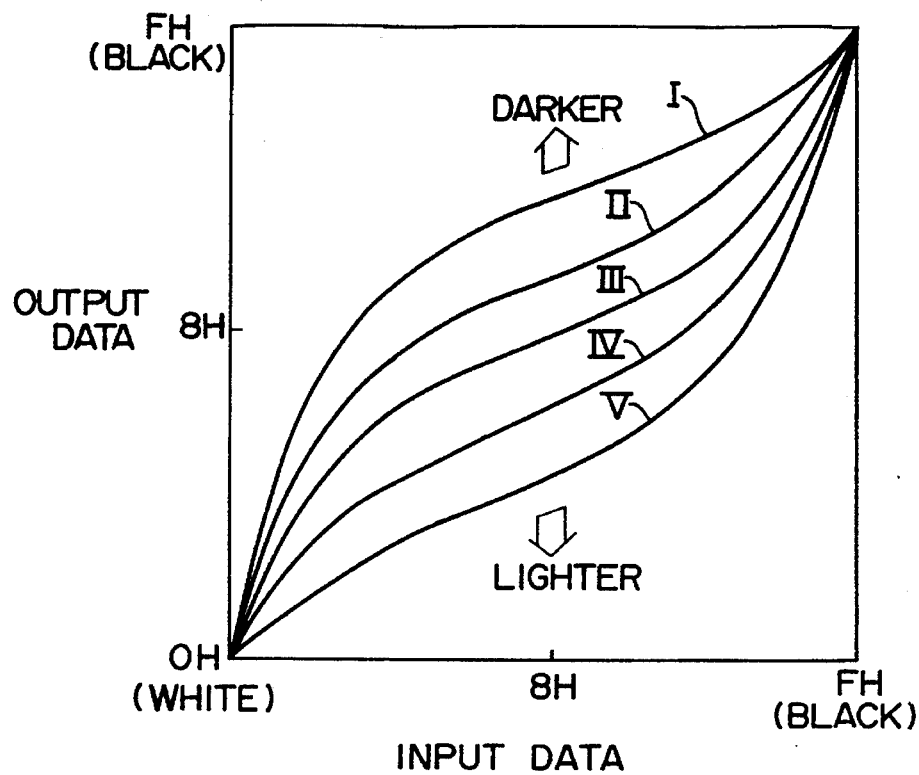
FIGS. 24(a) and 24(b) are diagrams showing the characteristics of a group of look-up tables prepared in advance.
Figure 24B:
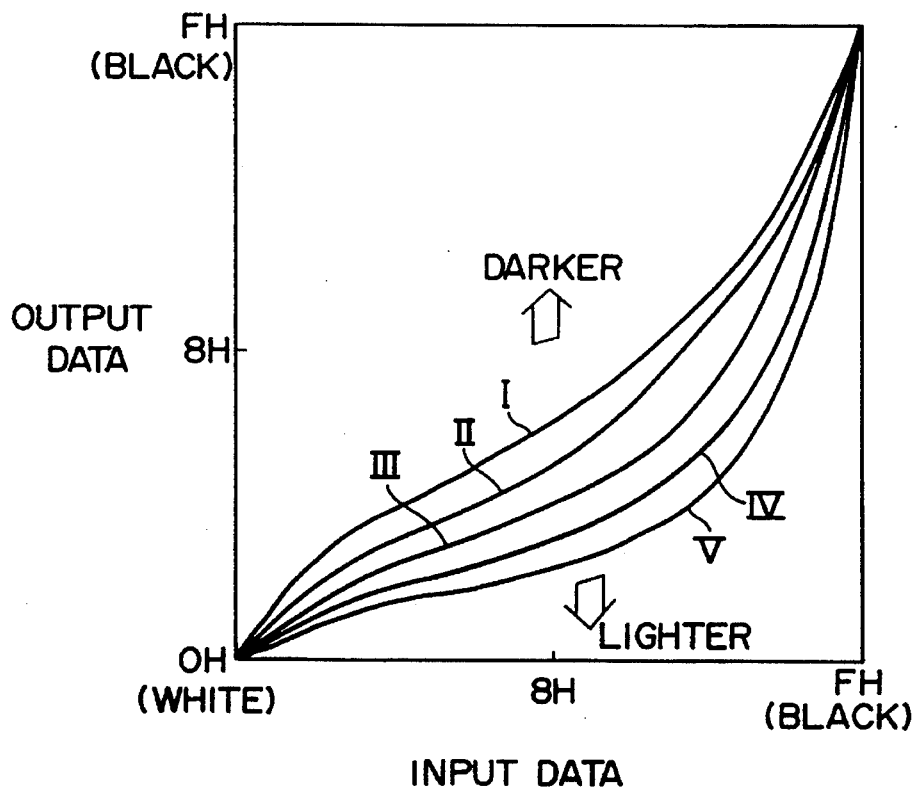

The characteristics shown in FIG. 24(a) mainly take into consideration the output characteristics of the printer. It can be adjusted so that the output image will be darker if curves I, II are selected with respect to a standard curve III, and lighter if curves IV, V are selected. The characteristics of FIG. 24(b) are obtained by applying a logarithmic correction to the characteristics of FIG. 24(a). These are obtained by combining both the output characteristics of a printer and the input characteristics of a CCD. In FIG. 24(b) also, curves I, II may be adjusted with respect to the characteristic of curve III to darken the output image, and curves IV, V may be adjusted to lighten the output image.

Next, a density generator 100 in the fifth embodiment will be described with reference to a conversion table shown in FIG. 27.

Four-bit tone data that has been corrected by the RAM 76 expresses density levels of OH–FH shown in FIG. 27. The four-bit data of the density levels of OH–FH is converted by the density generator 100 into nine-bit tone data that is in accordance with the conversion table of the kind shown in FIG. 27. The seven most significant bits of the nine-bit data are output to a pulse-width converting (PWM) D/A converter 77, and the two least significant bits are output to a laser drive circuit and laser 81. In accordance with the pulse-width modulation information expressed by the seven most significant bits, the laser driver circuit and laser 81 are turned ON/OFF for a predetermined length of time, and the quantity of light when the laser is ON is controlled by density information based on the two least significant bits of data.

In a case where the data corrected by the RAM 76 is density level 6 (6H), for example, in FIG. 27, the data is converted into data "010000011"B (where B indicates a binary number) by the density generator 100. In this case, the printer must achieve a density expression of 6H, namely 6/16, with respect to the deep black of density FH (16 when expressed as a decimal number). Accordingly, with regard to the seven most significant bits, a PWM output for producing "0100000"B (32 when expressed as a decimal number), namely a pulse width of 32%, is obtained to control the laser emission time. As for the intensity of the laser light expressed by the two least significant bits, if 11B expressed at density levels 3 through 15 is 100%, then 10B at density level 2 indicates 66.6%, 01B at density level 1 indicates 33.3%, and 00B at density level 0 indicates 0%.

At density level 6 in this example, density is expressed by a pulse-width modulation of 32% and a laser light quantity of 100%.

Accordingly, as will be understood also from the conversion table shown in FIG. 27, if the density level is above a predetermined density level (density level 3 in this example), the density generator 100 fixes the laser light quantity at a predetermined light quantity and performs the expression of density by pulse-width modulation. If the density level is less than the predetermined level, pulse width is fixed at a predetermined pulse width and density expression at a low density is performed by changing over the intensity of the laser light.

Figure 29:
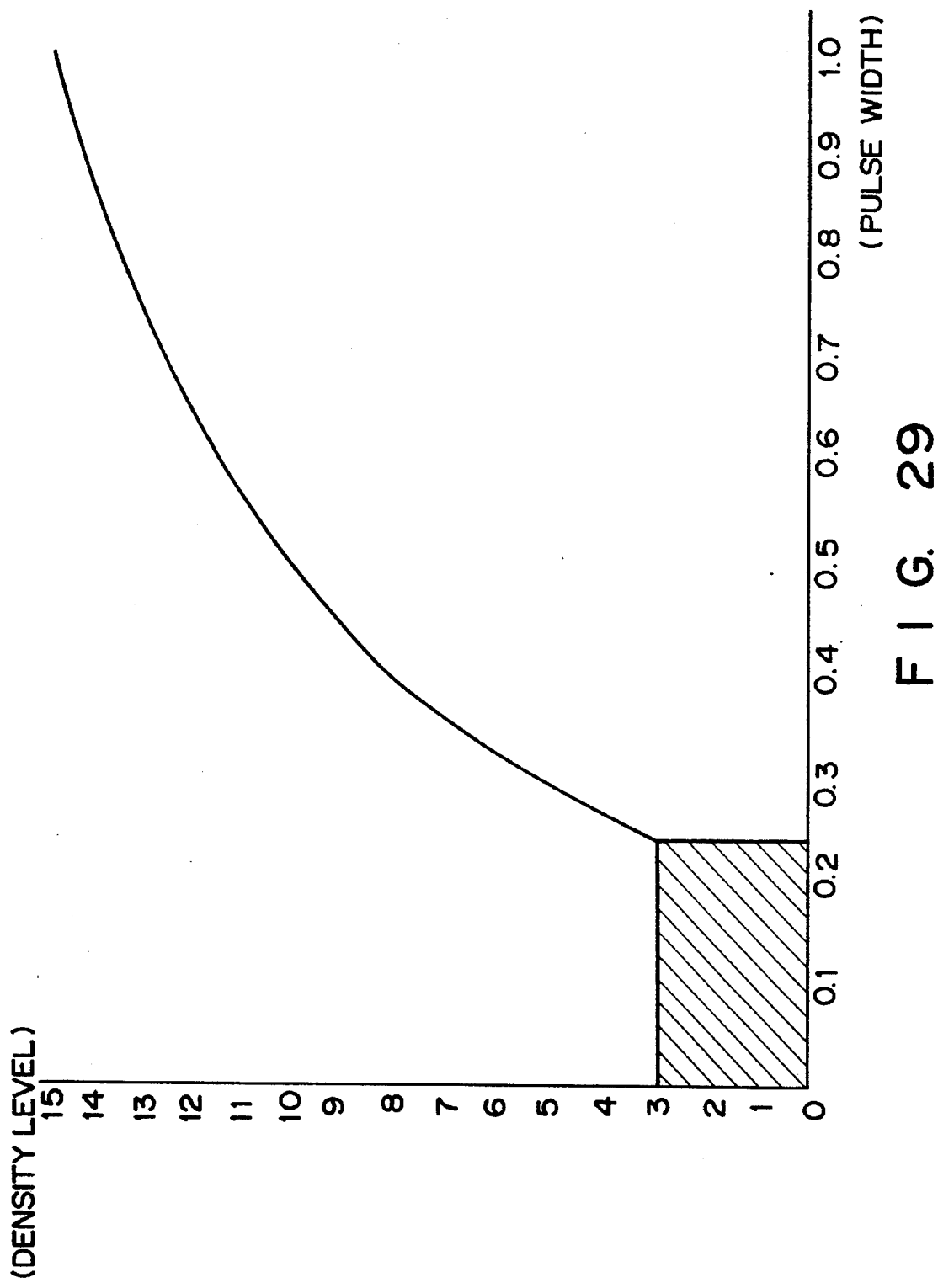
FIG. 29 is a diagram showing the relationship between density level and pulse width.

The foregoing is shown in FIG. 29, in which the shaded portion is that wherein density expression is carried out by the intensity of the laser light.

In the foregoing embodiment, an example is given in which the total number of bits is nine, namely seven bits for pulse-width modulation and two bits for the quantity of laser light, in 16 tones. However, it goes without saying that it is unnecessary to stipulate the numbers of bits with an increase in the number of tones of the multivalued data.

Further, though the dot diameters of the laser light quantity are divided into the four stages of 0%, 0.33%, 66.6% and 100%, it is not essential for the division to be made into equal differences.

PWM is described in the foregoing example. However, it is obvious that if another half-tone processing technique such as dither processing or an error diffusion method is used, then, by using this technique in conjunction with the light-intensity modulation of the invention, the same effects can be achieved. Such an arrangement therefore need not be described.

Returning to FIG. 21, the most significant seven-bit tone data converted by the density generator 100 is converted into an analog signal signal of levels 0–16 by a D/A converter 77. A comparator 79 compares this analog signal with a sawtooth waveform having a predetermined period output by a signal generator 78, and a conversion is made from a signal in the depth direction to a signal in the length direction. In other words, a pulse-width conversion is applied to the signal before it is output to a laser driver circuit and laser 81.

This will now be described with reference to the timing chart shown in FIG. 25.

Figure 25:
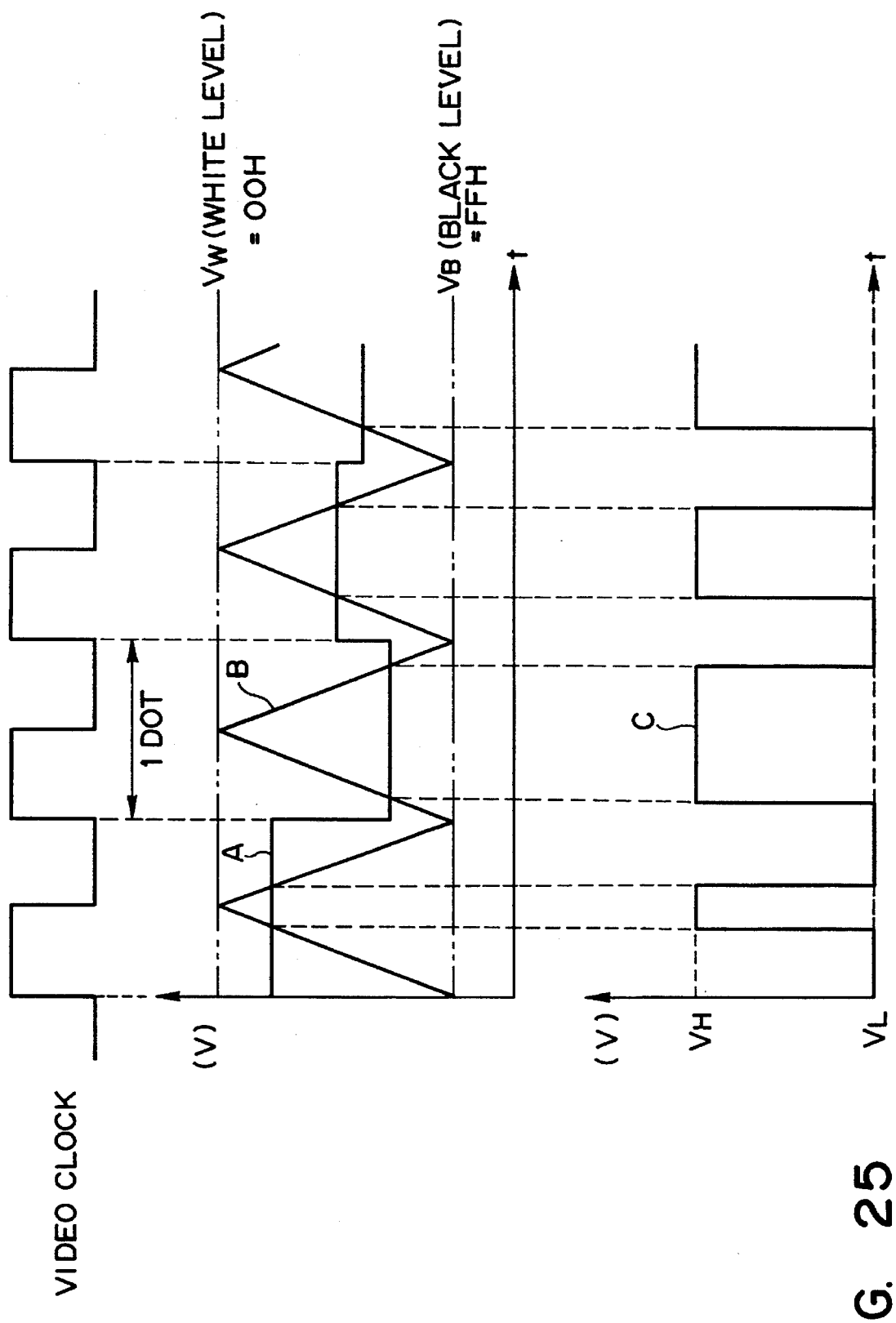
FIG. 25 is a diagram showing the principle of pulse-width modulation.

A signal A shown in FIG. 25 is the image signal output by the D/A converter 77, and a signal B is the sawtooth waveform from the signal generator 78. The signals A and B are synchronized by a video clock, as shown in FIG. 25.

By comparing the signals A and B in the comparator 79, a signal C whose length corresponds to the level of signal A is produced (the output of the comparator 79 turns ON when the relation A<B holds).

It should be noted that it will suffice if the signal from the signal generator 78 is a signal which repeats at a predetermined period, and therefore this signal need not necessarily be a sawtooth signal.

Next, the output signal C of the comparator 79 (the signal following pulse-width modulation) enters the laser driver circuit and laser 81 of FIG. 21 to drive a laser diode (not shown). A laser beam 86 emitted by the laser diode is oscillated to the left and right by a slowly rotating polygonal mirror 84 to scan a photosensitive body 89 though an f–θ lens 85. At this time a portion of the scanning beam 86 is detected by a beam detector (not shown) and is used as the video clock or the synchronizing signal of the signal generator 78.

After the photosensitive body 89 is uniformly charged by a charging device 87, an electrostatic latent image is formed on its surface. The latent image is then developed by a developing device. The development entails transferring the latent image to a transfer material 93 by a transfer charging device 90 and then fixing the transferred image by thermal fixing rollers 94, 95. The developing agent left on the surface of the photosensitive body 89 without being transferred is recovered by a cleaner 91. The electric charge on the photosensitive body 89 is removed by pre-exposure 92. This process is then repeated in the same manner.

Density expression achieved by modulation of the quantity of laser light will now be described.

Figure 26:
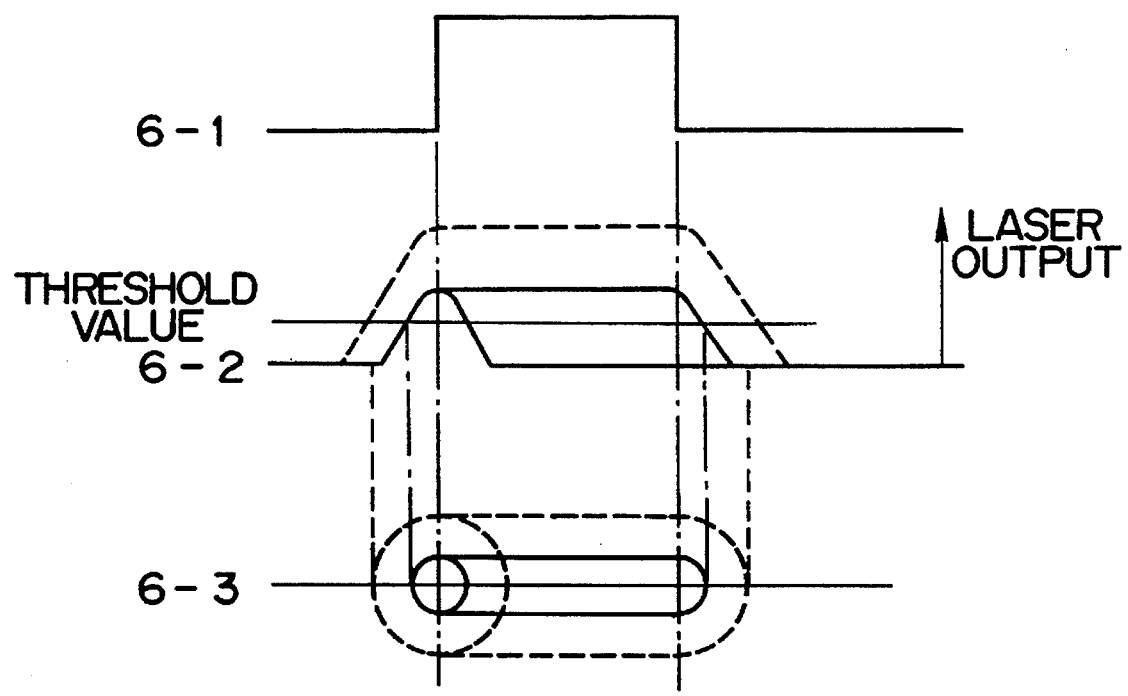
FIG. 26 is a diagram showing the occurrence of a change in density due to modulation of a quantity of laser light.

A signal waveform after pulse-width modulation is shown at 6-1 in FIG. 26. The waveform shown at 6-2 indicates pulse width (decided by PWM) based on the signal waveform 6-1. Dot diameter is enlarged (as shown by the dashed line) by an increase in the threshold value and laser output which form the latent image on the photosensitive drum when the laser light quantity is changed. As a result, area modulation of the latent image, namely density modulation per dot, is carried out as indicated by the broken line 6-3.

The operation of the laser driver circuit and laser 81 will now be described with reference to FIG. 28.

Figure 28:
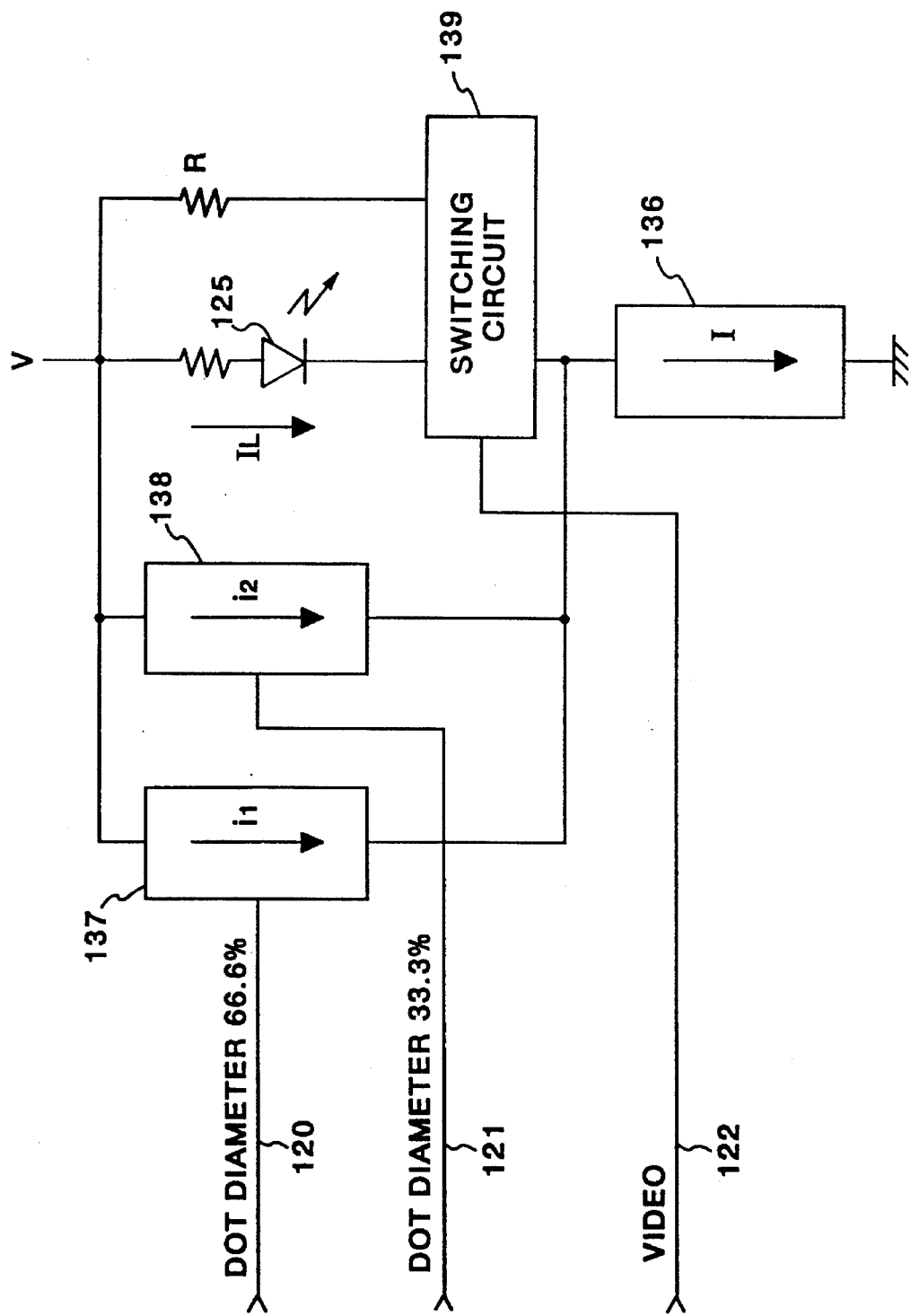
FIG. 28 is a diagram showing a laser drive circuit and a laser in the fifth embodiment.

In FIG. 28, numeral 136 denotes a constant-current circuit for producing a constant current I, and numerals 137, 138 denote constant-current switching circuits through which constant currents $i_1$, $i_2$ are passed in dependence upon control signals 120, 121, respectively.

First, a case will be described in which a dot diameter of 100% is designated. In such case, the control signals 120, 121 are both "0" and the constant currents $i_1$, $i_2$ do not flow. Accordingly, a current $I_L$ which flows into a laser 125 agrees with a current I produced by the constant-current circuit 136. The switching circuit 139 changes over the connection of the constant-current circuit 136 based on the input level of a video signal 122 applied to the switching circuit. For example, the switching circuit 139 operates in such a manner that the current $I_L$ is passed through the laser 125 while the video signal 122 is "1", though the current I is passed through resistor R when the video signal 122 becomes "0".

Next, in a case where 66.6% is designated as the dot diameter, the control signal 120 is made "1" and the control signal 121 is made "0", whereby the current $i_1$ flows into the constant-current switching circuit 137. Since the current I produced by the constant-current circuit 136 is constant, the following relationship will be established if the current flowing through the laser 125 is $I_L$:

$$I = I_L + i_1$$

Accordingly, the current IL which flows through the laser 125 is expressed by the following equation and is capable of being reduced:

$$I_L = I - i_1$$

Further, when the control signal which designates a dot diameter of 33.3% is "1", the current $i_2$, which satisfies the relation $i_2 > i_1$, flows into the constant-current switching circuit 138. As a result, the current $I_L$ which flows through the laser 125 is reduced further, as indicated by the following equation:

$$I_L = I - i_2$$

Accordingly, by controlling the driving current value of the laser 125, the dot diameter of the emitted laser beam can be changed.

Thus, in accordance with the embodiment described above, when multiple-tone printing is performed, printing is carried out only by pulse-width modulation if the density level is above a predetermined density level. If the density level is less than the predetermined level, intensity modulation of the laser is performed at a fixed value of pulse-width modulation. This makes it possible to raise the printed quality of low-density data.

According to the foregoing embodiment, when the density level is above a predetermined density level, the quantity of laser light is made constant and expression of density is performed based upon pulse width. If the density level is below the predetermined level, the pulse width is made constant and expression of density is performed based upon the intensity of the quantity of laser light. However, in the embodiment described below, it is attempted to express a maximum density level by changing the quantity of laser light even at a maximum density level (black).

In a laser-beam printer, the image is formed by raster scanning and therefore it is difficult to output a maximum density level (black). In this embodiment, the intensity of the laser beam is increased even at the maximum density level (black).

The sixth embodiment of the invention will be described with reference to FIGS. 30 through 32.

Figure 30:
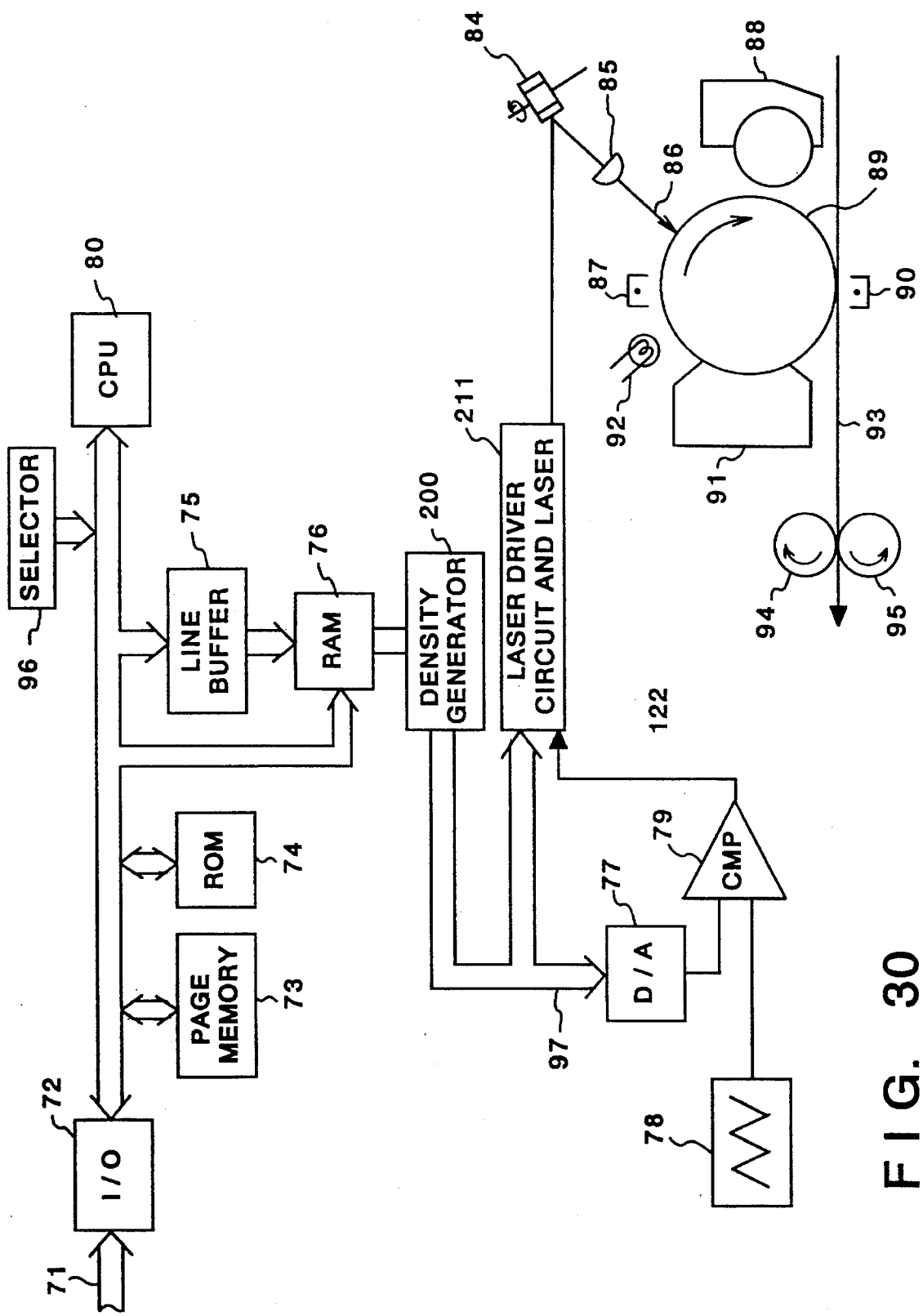
FIG. 30 is a block diagram showing a laser-beam printer in a sixth embodiment.

FIG. 30 is a block diagram of the sixth embodiment, in which the circuit components are the same as in the arrangement of FIG. 21 with the exception of a density generator 200 and a laser driver circuit and laser 211.

In this embodiment, the density generator 200 has a conversion table which, as shown in FIG. 31, is composed of a total of ten bits for density levels of 0 to 15, namely seven most significant bits for a PWM input and three least significant bits for a laser light-modulated input.

The contents of the seven most significant bits for the PWM input are the same as those in the foregoing embodiment. The contents of the three least significant bits for the laser-light modulated input are as follows: If the intensity of the laser light at the density levels 3–14 (011B) is 100%, then the laser light intensity is 0% at the density level 0 (000B), 33.3% at the density level 1 (000B), 66.6% at the density level 2 (000B), and 133.3% at the maximum density level (black) 15 (100B). This operation, namely the adjustment of laser light intensity at a predetermined density level, makes it possible to raise the tone quality of a low-density output and maximum density output.

Figure 32:
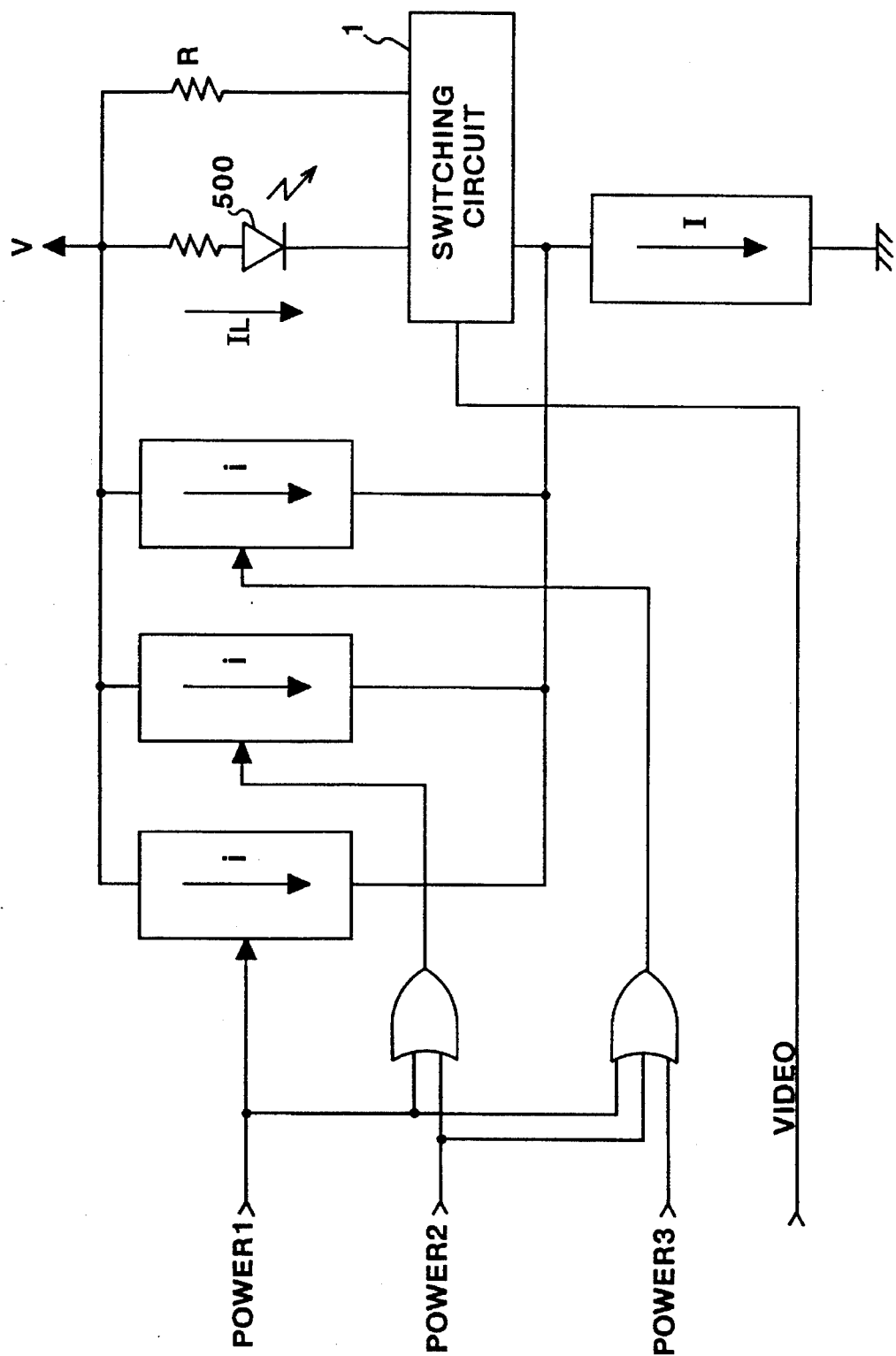
FIG. 32 is a diagram showing a laser drive circuit and a laser in the sixth embodiment.

FIG. 32 is a diagram illustrating the laser driver circuit and laser 211. Current and dot diameter for each density level are as shown in the following Table:

TABLE 1

| DENSITY LEVEL | POWER 1 | 2 | 3 | CURRENT $I_L$ | DOT DIAMETER (%) |
|---|---|---|---|---|---|
| 1 | 1 | 0 | 0 | I - 3i | 33.3 |
| 2 | 0 | 1 | 0 | I - 2i | 66.6 |
| 3–14 | 0 | 0 | 1 | I - i | 100.0 |
| 15 | 0 | 0 | 0 | I | 133.3 |

As described above, dot diameter is changed by limiting the driving current value of the laser 500, and dot diameter at the maximum density level also can be increased.

In accordance with the present invention as described above, it is possible to obtain an excellent half-tone image even at low and high densities.

As many apparently widely different embodiments of the present invention can be made without departing from the spirit and scope thereof, it is to be understood that the invention is not limited to the specific embodiments thereof except as defined in the appended claims.

What is claimed is:

1. An image signal modulating device in a recording apparatus which forms an output image based upon a multivalued input recording signal, comprising:

clock generating means for generating a clock signal;

converting means for converting the multivalued input recording signal into a plurality of corresponding binary image signals; and output means for outputting the plurality of binary image signals from said converting means in response to the clock signal from said clock generating means, wherein said output means is outputting the plurality of binary image signals of different phase.

2. An image signal modulating device according to claim 1, wherein said output means outputs a first binary signal defining a leading edge of each of the plurality of binary image signals converted by said converting means a second binary signal defining a trailing edge of each of the plurality of binary image signals.

3. An image signal modulating device according to claim 2, wherein said output means includes two comparators for outputting the first and second binary signals.

4. An image signal modulating device according to claim 3, wherein the multivalued input recording signal is inputted as one input of each of the two comparators.

5. An image signal modulating device in a recording apparatus which forms an output image based upon a multivalued input recording signal, comprising:

clock generating means for generating a clock signal;

converting means for converting the multivalued input recording signal into a plurality of corresponding binary image signals; and output means for outputting the plurality of binary image signals from said converting means in response to the clock signal from said clock generating means, wherein said clock generating means generates a plurality of clock signals of the same frequency but of mutually different phase.

6. An image signal modulating device according to claim 5, wherein said output means outputs a first binary signal defining a leading edge of each of the plurality of binary image signals converted by said converting means and a second binary signal defining a trailing edge of each of the plurality of binary image signals.

7. An image signal modulating device according to claim 6, wherein said output means includes two comparators for outputting the first and second binary signals.

8. An image signal modulating device according to claim 7, wherein the multivalued input recording signal is inputted as one input of each of the two comparators.

9. An image signal modulating method in a recording apparatus which forms an output image based upon a multivalued input recording signal, comprising the steps of:

generating a clock signal;

converting the multivalued input recording signal into a plurality of corresponding binary image signals; and outputting the plurality of binary image signals generated at said converting step within one period of the multivalued input recording signal in response to the clock signal generated at said clock generating step; and performing pulse-width modulation at a time unit shorter than the period of the clock signal.

10. An image signal modulating method according to claim 9, wherein in said outputting step a first binary signal is output defining a leading edge of each of the plurality of binary image signals converted in said converting step and a second binary signal is output defining a trailing edge of each of the plurality of binary image signals.

11. An image signal modulating method according to claim 10, wherein in said outputting step an output means is utilized which includes two comparators for outputting the first and second binary signals.

12. An image signal modulating method according to claim 11, wherein the multivalued input recording signal is inputted as one input of each of the two comparators.

13. An image signal modulating method according to claim 9, wherein in said outputting step each of the plurality of binary image signals are output in a different phase.

14. An image signal modulating method according to claim 9, wherein in said generating step a plurality of clock signals are generated of the same frequency but of mutually different phase.

* * * * *

UNITED STATES PATENT AND TRADEMARK OFFICE
CERTIFICATE OF CORRECTION

PATENT NO. : 5,488,487

DATED : January 30, 1996

INVENTOR(S) : MASAKI IJIMA ET AL.

It is certified that error appears in the above-identified patent and that said Letters Patent is hereby corrected as shown below:

Title page, item
[75] Inventors

"Hiroshi Atobe" should be deleted.

Title page, item
[30] Foreign Application Priority Data

"Nov. 23, 1989 [JP] Japan ......... 1-299732" should read
--Nov. 20, 1989 [JP] Japan ........ 1-299732--.

COLUMN 1

Line 53, "converting" should read --converted--.

COLUMN 3

Line 41, "in" should read --in that--.

COLUMN 5

Line 38, "form" should read --from--.

COLUMN 13

Line 13, "signal signal" should read --signal-- and "0-16by" should read --0-16 by--.

UNITED STATES PATENT AND TRADEMARK OFFICE
CERTIFICATE OF CORRECTION

PATENT NO. : 5,488,487

DATED : January 30, 1996

INVENTOR(S) : MASAKI IJIMA ET AL.

It is certified that error appears in the above-identified patent and that said Letters Patent is hereby corrected as shown below:

COLUMN 14

Line 54, "data." should read --data. ¶ SIXTH EMBODIMENT--.

COLUMN 15

Line 67, "means" should read --means,--.

Signed and Sealed this

Second Day of July, 1996

BRUCE LEHMAN

*Commissioner of Patents and Trademarks*

*Attest:*

*Attesting Officer*